United States Patent
Venkatesh et al.

(10) Patent No.: US 7,284,016 B2
(45) Date of Patent: Oct. 16, 2007

(54) CLIENT-SERVER PROTOCOL FOR DIRECTORY ACCESS OF SNAPSHOT FILE SYSTEMS IN A STORAGE SYSTEM

(75) Inventors: Dinesh Venkatesh, Westford, MA (US); Xiaoye Jiang, Shrewsbury, MA (US); Jiannan Zheng, Ashland, MA (US); Uresh Vahalia, Newton, MA (US)

(73) Assignee: EMC Corporation, Hopkinton, MA (US)

( * ) Notice: Subject to any disclaimer, the term of this patent is extended or adjusted under 35 U.S.C. 154(b) by 893 days.

(21) Appl. No.: 10/308,445

(22) Filed: Dec. 3, 2002

(65) Prior Publication Data

US 2004/0107222 A1 Jun. 3, 2004

(51) Int. Cl.
*G06F 12/00* (2006.01)
(52) U.S. Cl. .................... 707/200; 707/202; 707/204; 711/202
(58) Field of Classification Search ............... 707/200, 707/202, 204; 711/202
See application file for complete search history.

(56) References Cited

U.S. PATENT DOCUMENTS

| 3,937,938 | A | 2/1976 | Matthews | 235/153 AK |
|---|---|---|---|---|
| 4,229,790 | A | 10/1980 | Gilliland et al. | 364/200 |
| 4,253,183 | A | 2/1981 | Taylor et al. | 371/16 |
| 4,315,313 | A | 2/1982 | Armstrong et al. | 364/200 |
| 4,365,292 | A | 12/1982 | Barnes et al. | 364/200 |
| 4,387,639 | A | 6/1983 | Brown et al. | 101/2 |
| 4,398,225 | A | 8/1983 | Cornaby et al. | 360/39 |
| 4,608,688 | A | 8/1986 | Hansen et al. | 371/11 |
| 4,686,620 | A | 8/1987 | Ng | 364/200 |
| 4,755,928 | A | 7/1988 | Johnson et al. | 364/200 |
| 5,060,185 | A | 10/1991 | Naito et al. | 364/900 |
| 5,206,939 | A | 4/1993 | Yanai et al. | 395/400 |
| 5,371,852 | A | * 12/1994 | Attanasio et al. | 709/245 |
| 5,381,539 | A | 1/1995 | Yanai et al. | 395/425 |
| 5,403,639 | A | * 4/1995 | Belsan et al. | 707/204 |
| 5,410,667 | A | * 4/1995 | Belsan et al. | 711/114 |
| 5,535,381 | A | 7/1996 | Kopper | 395/600 |

(Continued)

OTHER PUBLICATIONS

Patterson et al., "A Case for Redundant Arrays of Inexpensive Disks (RAID)", 1988, ACM, 0-89791-268-3/88/006/0109, pp. 109-116.*

(Continued)

*Primary Examiner*—Don Wong
*Assistant Examiner*—Michael Le
(74) *Attorney, Agent, or Firm*—Richard Auchterlonie; Novak Druce & Quigg, LLP.

(57) ABSTRACT

Internally, a production file system and each of its related snapshot file systems have a common file system identifier (fid') and a unique respective file system identifier (fsid'). Externally, the production file system and each of its related snapshot file systems has a common file system identifier (fsid) and a unique respective file identifier (fid). For example, the "fsid" and "fid" for the production and snapshot file systems are interchanged between a client-server protocol layer and a logical volume layer in a file server. Moreover, the file handle for an object indicates whether an object is in either a production file system that is not configured to have related snapshots, a production file system that is configured to have related snapshots, or a snapshot file system. When the object is in a snapshot file system, the file handle also indicates the related production file system.

41 Claims, 16 Drawing Sheets

U.S. PATENT DOCUMENTS

| | | | | |
|---|---|---|---|---|
| 5,566,331 | A | * | 10/1996 | Irwin et al. .................... 707/10 |
| 5,673,382 | A | | 9/1997 | Cannon et al. ......... 395/182.04 |
| 5,737,747 | A | | 4/1998 | Vishlitzky et al. ........... 711/118 |
| 5,742,792 | A | | 4/1998 | Yanai et al. ................. 395/489 |
| 5,790,773 | A | * | 8/1998 | DeKoning et al. ............. 714/6 |
| 5,819,292 | A | | 10/1998 | Hitz et al. ................... 707/203 |
| 5,819,310 | A | * | 10/1998 | Vishlitzky et al. ........... 711/114 |
| 5,829,046 | A | | 10/1998 | Tzelnic et al. ............... 711/162 |
| 5,829,047 | A | | 10/1998 | Jacks et al. .................. 711/162 |
| 5,857,208 | A | * | 1/1999 | Ofek ........................... 707/204 |
| 5,915,264 | A | | 6/1999 | White et al. ................. 711/168 |
| 5,930,491 | A | * | 7/1999 | Hilgendorf et al. .......... 712/209 |
| 6,006,018 | A | * | 12/1999 | Burnett et al. ............... 709/219 |
| 6,061,770 | A | | 5/2000 | Franklin ..................... 711/162 |
| 6,076,148 | A | | 6/2000 | Kedem ....................... 711/162 |
| 6,081,875 | A | * | 6/2000 | Clifton et al. ............... 711/162 |
| 6,212,531 | B1 | * | 4/2001 | Blea et al. ................... 707/204 |
| 6,269,431 | B1 | | 7/2001 | Dunham ..................... 711/162 |
| 6,279,011 | B1 | | 8/2001 | Muhlestein ................. 707/204 |
| 6,311,193 | B1 | * | 10/2001 | Sekido ........................ 707/202 |
| 6,366,987 | B1 | * | 4/2002 | Tzelnic et al. ............... 711/162 |
| 6,421,767 | B1 | * | 7/2002 | Milillo et al. ................ 711/162 |
| 6,434,681 | B1 | | 8/2002 | Armangau ................... 711/162 |
| 6,549,992 | B1 | | 4/2003 | Armangau et al. .......... 711/162 |
| 6,594,744 | B1 | * | 7/2003 | Humlicek et al. ........... 711/162 |
| 6,618,794 | B1 | | 9/2003 | Sicola et al. ................. 711/154 |
| 6,643,654 | B1 | * | 11/2003 | Patel et al. .................... 707/10 |
| 6,651,075 | B1 | * | 11/2003 | Kusters et al. .............. 707/204 |
| 6,820,099 | B1 | * | 11/2004 | Huber et al. ................. 707/204 |
| 6,829,617 | B2 | * | 12/2004 | Sawdon et al. .............. 707/102 |
| 2002/0111861 | A1 | * | 8/2002 | Sakamoto et al. ............. 705/14 |
| 2003/0061278 | A1 | * | 3/2003 | Agarwalla et al. ........... 709/203 |
| 2003/0079102 | A1 | | 4/2003 | Lubbers et al. .............. 711/202 |
| 2003/0158873 | A1 | | 8/2003 | Sawdon et al. .............. 707/204 |
| 2003/0182253 | A1 | * | 9/2003 | Chen et al. ..................... 707/1 |
| 2003/0182301 | A1 | * | 9/2003 | Patterson et al. ............ 707/102 |
| 2003/0225742 | A1 | * | 12/2003 | Tenner et al. ................... 707/2 |
| 2003/0229651 | A1 | * | 12/2003 | Mizuno et al. .............. 707/200 |
| 2004/0030727 | A1 | | 2/2004 | Armangau et al. ............. 714/6 |
| 2004/0030846 | A1 | | 2/2004 | Armangau et al. .......... 711/154 |
| 2004/0030951 | A1 | | 2/2004 | Armangau ...................... 714/6 |
| 2004/0088301 | A1 | * | 5/2004 | Mahalingam et al. ........ 707/100 |

OTHER PUBLICATIONS

Preston, W. Curtis, "Unix Backup and Recovery", 1999, O'Reilly and Associates, pp. 600, 653-654.*

"RFC 1094—NFS: Network File System Protocol Specification," Network Working Group, Request for Comments: 1094, Sun Microsystems, Inc., Mar. 1989, pp. 1-27, http://frc.sunsite.dk/rfc1094.html.

Uresh Vahalia, *Unix Internals—The New Frontiers*, Prentice-Hall Inc., New Jersey, 1996, Chapter 9, File System Implementations, pp. 261-289.

Brian W. Kerninghan and Rob Pike, *The UNIX Programming Environment*, Prentice-Hall Inc., New Jersey, 1984, Chapter 2, The File System, pp. 41-70.

Mendel Rosenblum and John K. Ousterhout, "The Design and Implementation of a Log-Structured File System," *ACM Transactions on Computer Systems*, vol. 10, No. 1, Feb. 1992, pp. 26-52.

Fred Douglis and John Ousterhout, "Log-Structured File Systems," in Spring COMPCON89, Feb. 27-Mar. 31, 1989, *Thirty-Fourth IEEE Computer Society International Conference*, San Francisco, CA, pp. 124-129.

David A. Patterson, Peter Chen, Garth Gibson, and Randy H. Katz, "Introduction to Redundant Arrays of Inexpensive Disks (RAID)," in Spring COMPCON89, Feb. 27-Mar. 31, 1989, *Thirty-Fourth IEEE Computer Society International Conference*, San Francisco, CA, pp. 112-117.

D.L. Burkes and R.K. Treiber, "Design Approaches for Real-Time Transaction Processing Remote Site Recovery," in Spring COMPCON90, Feb. 26-Mar, 2, 1990, *Thirty-Fifth IEEE Computer Society International Conference*, San Francisco, CA, pp. 568-572.

"VERITAS NetBackup and Storage Migrator" http://www.sun.com/stora . . . /netbackup.html; $sessionid$QEOQTDQAAC2QHAMTAIFU5Y, published at least as early as Oct. 28, 2000, 5 pages.

R. Stager and D. Hitz, Internet Draft, filename "*draft-stager-iquard-netapp-backup-0.5.txt*" Network Data Management Protocol (NDMP), last update Oct. 12, 1999, pp. 1-73.

"Network Data Management Protocol (NDMP)," http://www.ndmp.org/info/; NDMP White Paper, http://www.ndmp.org/info/technology/wp.html; "Protocol Specification Summary, Document Version: 1.7.2S," http://www.ndmp.org/info/spec_summary.html; "Legato Systems Embraces the NDMP Standard: Legato Networker Software to be NDMP Compliant in Q3," http://www-ftp.legata.com/News/Press/PR209.html; published at least as early as Oct. 11, 1999, 17 pages.

"Snapshot", definition of snapshot in computing dictionary, the Free Online Dictionary, Farlex, Inc., 2005, printed Jun. 9, 2005, 2 pages.

Robert F. Graf, Radio Shack Dictionary of Electronics, Fourth Edition, Second Printing—1974, Howard W. Sams & Co., Indianapolis, Indiana, p. 544, 4 pages printed.

Robert F. Graf, Modern Dictionary of Electronics, Butterworth-Heinemann, Newton, MA, p. 938, 3 pages, 1997.

Abandonment on Mar. 19, 1991 of Trademark Application for "Snapshot Copy" by Storage Technology Corporation, Trademark Electronic Search System, United States Patent and Trademark Office, printed from the Internet Jun. 7, 2005, 1 page.

NetApp Snapshot Technology Offers Unique Benefits, Network Appliance, Inc., Sunnyvale, CA, printed from the Internet Jun. 7, 2005, 2 pages.

Hitachi Copy-on-Write Snapshot Software, Hitachi Data Systems Corporation, Santa Clara, CA, printed from the Internet Jun. 7, 2005, 1 page.

Snapshot Agents from FalconStor for Databases, North American Systems International, Eagan, MN, printed from the Internet Jun. 7, 2005, 2 pages.

Mile D. Pekic, "The effects of implementing snapshot copy," Minframe Week, Jul. 23, 2003, Xephon, Dallas TX 75355, 2 pages.

Christophe Bertrand, Examining Hitachi Copy-on-Write Snapshot Software Capabilities for Hitachi Thunder 9500™ V Series Storage Systems, Hitachi Data Systems Corporation, Santa Clara, CA, Aug. 2004, 29 pages.

Search Results for "snapshot" from the Trademark Electronic Search System, United States Patent and Trademark Office, printed from the Internet Jun. 7, 2005 (.Pa, 57 pages.

* cited by examiner

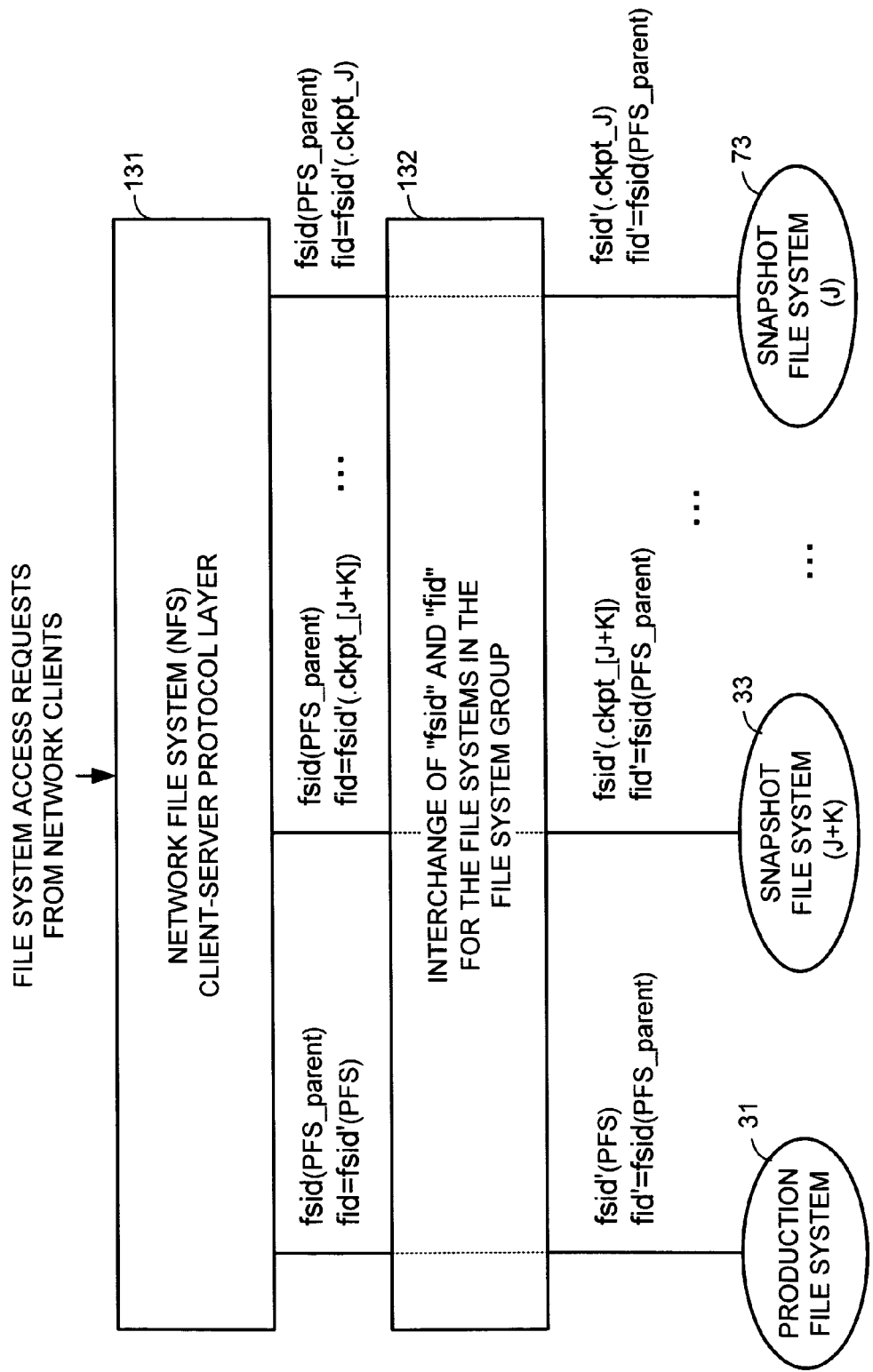

| BLK1 | BLK2 | BLK3 | BLK4 |
|---|---|---|---|
| 0 | fsid(FS) | 0 | fid(FS\...\OBJ) |

BLK1 .EQ. 0

FILE HANDLE FOR OBJECT IN A FILE SYSTEM THAT IS NOT CONFIGURED FOR HAVING SNAPSHOT FILE SYSTEMS

FIG. 20

| BLK1 | BLK2 | BLK3 | BLK4 |
|---|---|---|---|
| fid(PFS) | fsid(PFS_parent) | fid(PFS) | fid(PFS\...\OBJ) |

BLK1 .NE. 0 AND BLK1 .EQ. BLK3

FILE HANDLE FOR OBJECT IN A PRODUCTION FILE SYSTEM THAT IS CONFIGURED FOR HAVING SNAPSHOT FILE SYSTEMS

FIG. 21

| BLK1 | BLK2 | BLK3 | BLK4 |
|---|---|---|---|
| fid(PFS) | fsid(PFS_parent) | fid(.ckpt_J) | fid(.ckpt_J\...\OBJ) |

BLK1 .NE. 0 AND BLK1 .NE. BLK3

FILE HANDLE FOR OBJECT IN A SNAPSHOT FILE SYSTEM

FIG. 22

CLIENT-SERVER PROTOCOL FOR DIRECTORY ACCESS OF SNAPSHOT FILE SYSTEMS IN A STORAGE SYSTEM

FIELD OF THE INVENTION

The present invention relates generally to computer data storage, and more particularly, to a snapshot copy facility for a data storage system.

BACKGROUND OF THE INVENTION

Snapshot copies of a data set such as a file or storage volume have been used for a variety of data processing and storage management functions such as storage backup, transaction processing, and software debugging.

Backup and restore services are a conventional way of reducing the impact of data loss from the network storage. To be effective, however, the data should be backed up frequently, and the data should be restored rapidly from backup after the storage system failure. As the amount of storage on the network increases, it is more difficult to maintain the frequency of the data backups, and to restore the data rapidly after a storage system failure.

In the data storage industry, an open standard network backup protocol has been defined to provide centrally managed, enterprise-wide data protection for the user in a heterogeneous environment. The standard is called the Network Data Management Protocol (NDMP). NDMP facilitates the partitioning of the backup problem between backup software vendors, server vendors, and network-attached storage vendors in such a way as to minimize the amount of host software for backup. The current state of development of NDMP can be found at the Internet site for the NDMP organization. Details of NDMP are set out in the Internet Draft Document by R. Stager and D. Hitz entitled "Network Data Management Protocol" document version 2.1.7 (last update Oct. 12, 1999).

One way of managing backup and restore services in a file server is to use a snapshot copy facility providing read-write access to a production data set and concurrent read-only access to any selected one of a number of related snapshot file systems. Each of the related snapshot file systems is the state of the production file system at a respective point in time when the snapshot file system was created. For a user to access a production file system named "D", for example, the user may enter a "change directory" (cd) operating system command of the form:
cd/A/B/C/D
where "C" is a directory containing "D", "B" is a directory containing "C", "A" is a directory containing "B", and "A" is contained in a root directory presently selected by the operating system for servicing client requests for file system access.

At this point, the file system named "D" has become the root directory presently selected by the operating system for servicing user requests for file system access. The user can then enter operating system commands that specify a path name with respect to the root directory "D" to a specific subdirectory or file in the file system "D".

The snapshot file systems for the production file system are contained in a special subdirectory named ".ckpt". If there are seven snapshots, including one snapshot of the file system "D" taken at 3:00 a.m. on each day of the week, for example, then the subdirectory named ".ckpt" is in the root directory of "D". This subdirectory named ".ckpt" contains the snapshots "sun", "mon", "tue", . . . , "sat". In this case, to view the snapshot file system last taken at 3:00 a.m. on a Monday, the user would enter:
cd/.ckpt/mon The user may restore a specific subdirectory or file after the user discovers that the original version of the subdirectory or file in the production file system has become corrupted. In this situation, the user may view the snapshots in order to find the most recent snapshot containing a version of the subdirectory or file that has not been corrupted, and then restores the original version in the production file system with the most recent version that has not been corrupted. For example, if the user finds that the production version of a file named "customers" has become corrupted and the most recent uncorrupted version is found in the snapshot taken the morning of last Tuesday, the user may restore the production version of the file with Tuesdays' version by entering a "copy" operating system command of the form:
copy/.ckpt/tue/customers customers

SUMMARY OF THE INVENTION

It has been discovered that it is advantageous to store and organize a production file system and its snapshot file systems in a file server in a way that is different from the way in which they appear to a user, such as a client networked to the file server. For example, the production file system and its related snapshot file systems are grouped together and configured or otherwise placed at the volume level in layered programming of the file server. When this file system group is mounted, a virtual root is created containing the snapshot file systems, e.g., the snapshot file systems have the respective path names/.ckpt_FS1, /.ckpt_FS2, /.ckpt_FS3, etc., with respect to the virtual root. The user can "mount" any selected one of these snapshot file systems by referencing the respective path name. Once each of the snapshot file systems has been mounted, it has a unique file system identifier (fsid). In addition, each snapshot file system is given the same file identifier (fid) within the file system of the snapshot file system. This internal organization of the snapshot file systems, however, is directly opposite to what a user would expect. Since the snapshots are related and are in the same directory as seen by the user, the user would expect each snapshot file system to have the same "fsid" and a different "fid".

It also has been discovered that the "file handle" used in a client-server protocol for access to files in the file server can be constructed in a certain way so as to facilitate access to the production file system or to any of its related snapshot file systems.

In accordance with a first aspect, the invention provides a method of accessing a group of related snapshot file systems stored in a data storage system. Each of the related snapshot file systems is the state of a production file system at a respective point in time. Each of the related snapshot file systems has been configured to have a common internal file identifier (fid') and a different respective internal file system identifier (fsid'). The method includes decoding a pathname to an object in one of the related snapshot file systems in accordance with a file access protocol. The decoding of the pathname to the object selects a common external file system identifier (fsid) for the group of related snapshot file systems. The common external file system identifier (fsid) for the group of related snapshot file systems is the common internal file identifier (fid'). The decoding of the pathname to the object also selects a respective external file identifier (fid) distinguishing the one related snapshot file system from the other related snapshot file systems in the group of related snapshot file systems. The decoding of the pathname to the object also selects a file identifier for the object within the one related snapshot file system. The method further includes accessing the object in the one related snapshot file system by using the common external file system identifier (fsid) for the group of related snapshot file systems to select the group of related snapshot file systems from within the data storage system, using the external file identifier (fid) distinguishing the one related snapshot file system from the other related snapshot file systems in the group of related snapshot file systems as the internal file system identifier (fsid') to select the one related snapshot file system stored in the data storage system from within the selected group of related snapshot file systems, and using the file identifier for the object within the one related snapshot file system to select and access the object from within the one related snapshot file system.

In accordance with another aspect, the invention provides a method of configuring a network file server for access to a group of related snapshot file systems in data storage of the network file server. Each of the related snapshot file systems is the state of a production file system at a respective point in time. The network file server has a client-server protocol layer of programming for client access to file system objects in the data storage of the network file server. The method includes configuring each of the related snapshot file systems to have a common internal file identifier (fid') and a different respective internal file system identifier (fsid'). The method further includes programming the network file server for interchanging the common internal file identifier (fid') with the different respective internal file system identifier (fsid') of each related snapshot file system for access of the client-server protocol layer to the related snapshot file system.

In accordance with yet another aspect, the invention provides a method of configuring a network file server for access to a group of related snapshot file systems in data storage of the network file server. Each of the related snapshot file systems is the state of a production file system at a respective point in time. The network file server has a client-server protocol layer of programming for client access to file system objects in the data storage of the network file server. The method includes configuring each of the related snapshot file systems to have a common internal file identifier (fid') and a different respective internal file system identifier (fsid'). The method further includes programming the network file server for interchanging the common internal file identifier (fid') with the internal file system identifier (fsid') of each related snapshot file system for access of the client-server protocol layer to the related snapshot file system.

In accordance with another aspect, the invention provides a method of operating a network file server having data storage storing a production file system and related snapshot file systems. Each of the related snapshot file systems is the state of the production file system at a respective point in time. The method includes the network file server responding to a directory lookup request from a client for access to a file system object in one of the related snapshot file systems by returning to the client a file handle pointing to the file system object in the one related snapshot file system. The method also includes the network file server responding to an access request including the file handle by decoding the file handle to locate and access the object in the one related snapshot file system. In addition, the network file server encodes in the file handle a file identifier indicating where the production file system is located in the data storage of the network file server. The file identifier indicates where the one related snapshot file system is located in the data storage of the network file server, and a file identifier indicating where the file system object is located within the one related snapshot file system.

In accordance with still another aspect, the invention provides a method of operating a network file server having data storage storing a production file system and related snapshot file systems. Each of the related snapshot file systems is the state of the production file system at a respective point in time. The method includes the network file server responding to a directory lookup request from a client for access to a file system object in the data storage of the network file server by returning to the client a file handle pointing to the file system object in the data storage of the network file server. The network file server responds to an access request including the file handle by decoding the file handle to locate and access the object in the data storage of the network file server. The network file server encodes in the file handle an indication of whether the file system object is in either a file system that is not configured for having related snapshot file systems, a production file system that is configured for having related snapshot file systems, or a snapshot file system.

In accordance with yet another aspect, the invention provides a network file server including data storage for storing a production file system and a group of related snapshot file systems. Each of the related snapshot file systems is the state of the production file system at a respective point in time. The network file server further includes a client-server protocol layer of programming for client access to file system objects in the data storage of the network file server. Each of the related snapshot file systems has a common internal file identifier (fid') and a different respective internal file system identifier (fsid'). The network file server is programmed for interchanging the common internal file identifier (fid') with the respective internal file system identifier (fsid') of each related snapshot file system for access of the client-server protocol layer to the related snapshot file system.

In accordance with yet still another aspect, the invention provides a network file server including data storage for storing a production file system and a group of related snapshot file systems. Each of the related snapshot file systems is the state of the production file system at a respective point in time. The network file server also includes a client-server protocol layer of programming for client access to file system objects in the data storage of the network file server. The client-server protocol layer responds to a directory lookup request from a client for access to a file system object in one of the related snapshot file systems by returning to the client a file handle pointing to the file system object in the one related snapshot file system. The client-server protocol layer also responds to an access request from a client. The access request includes the file handle. The client-server protocol layer responds to the access request by decoding the file handle to locate and access the object in the one related snapshot file system. In addition, the client-server protocol layer encodes in the file handle a file identifier indicating where the production file system is located in the data storage of the network file server, a file identifier indicating where the one related snapshot file system is located in the data storage of the network file server, and a file identifier indicating where the file system object is located within the one related snapshot file system.

In accordance with a final aspect, the invention provides a network file server including data storage for storing a production file system and a group of related snapshot file systems. Each of the related snapshot file systems being the state of the production file system at a respective point in time. The network file server also includes a client-server protocol layer of programming for client access to file system objects in the data storage of the network file server. The client-server protocol layer responds to a directory lookup request from a client for access to a file system object in the data storage by returning to the client a file handle pointing to the file system object in the data storage. The client-server protocol layer also responds to an access request from the client. The access request includes the file handle. The client-server protocol layer responds to the access request by decoding the file handle to locate and access the object in the data storage. The client-server protocol layer encodes in the file handle an indication of whether the file system object is in either a file system that is not configured for having related snapshot file systems, a production file system that is configured for having related snapshot file systems, or a snapshot file system.

BRIEF DESCRIPTION OF THE DRAWINGS

Additional features and advantages of the invention will be described below with reference to the drawings, in which:

FIG. 14 is a block diagram showing the interchange of file system identifiers and file identifiers for file systems in a file system group in the programming of the file system layer between a client-server protocol layer and the file systems as stored in the network file server;

FIG. 20 shows encoding and decoding of a file handle for an object in a file system that is not configured for having related snapshot file systems;

FIG. 21 shows encoding and decoding of a file handle for an object in a production file system that is configured for having related snapshot file systems; and FIG. 22 shows encoding and decoding of a file handle for an object in a snapshot file system.

Figure 1:
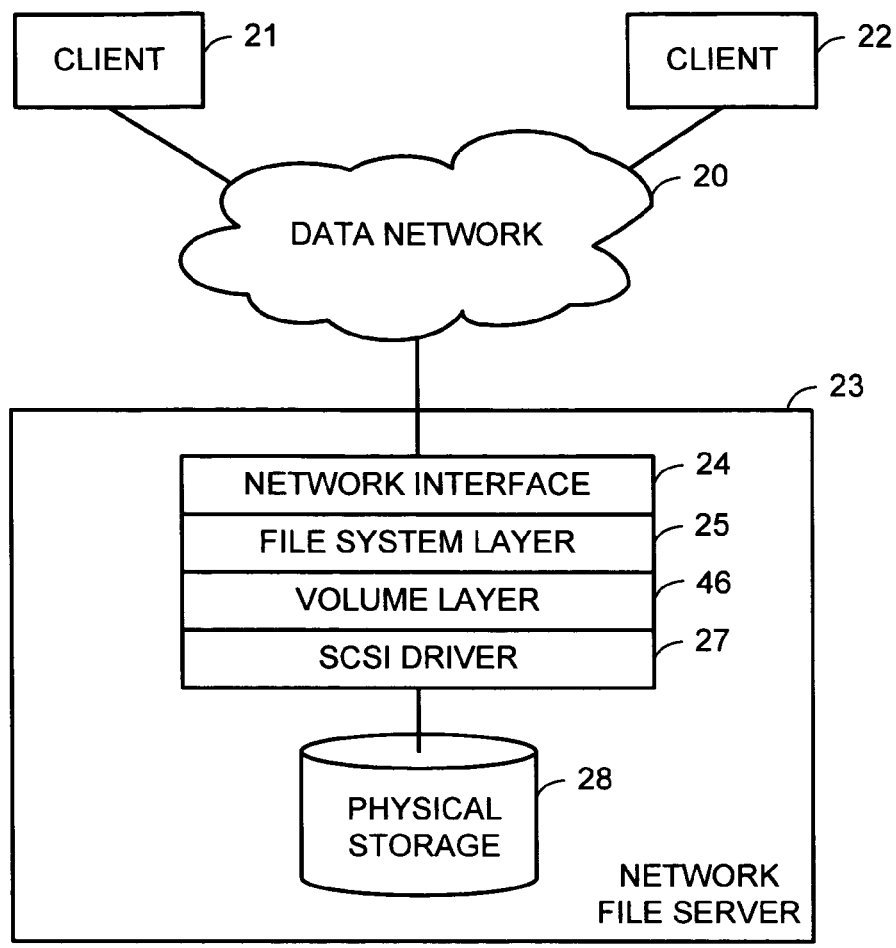
FIG. 1 is a block diagram of a data network including clients that share a network file server.

While the invention is susceptible to various modifications and alternative forms, specific embodiments thereof have been shown in the drawings and will be described in detail. It should be understood, however, that it is not intended to limit the invention to the particular forms shown, but on the contrary, the intention is to cover all modifications, equivalents, and alternatives falling within the scope of the invention as defined by the appended claims.

DETAILED DESCRIPTION OF THE PREFERRED EMBODIMENTS

The present invention will be described with respect to a client-server protocol for directory access of snapshot file systems in a storage system. The snapshot file systems can be maintained in storage by a conventional snapshot copy facility, such as the snapshot copy facility described below with reference to FIGS. 1-13.

I. A Prior-Art Multiple Snapshot Copy Facility for a Network File Server

With reference to FIG. 1, there is shown a data network 20 linking clients 21, 22 to a network file server 23. The network file server has a network interface 24 for coupling to the data network, a file system layer 25 for organizing data into a hierarchical structure of files and directories, a volume layer 46 for organizing the data into logical volumes of data blocks, a Small Computer System Interface (SCSI) driver 27, and physical storage 28 linked to the volume layer 46 through the SCSI driver 27.

Figure 2:
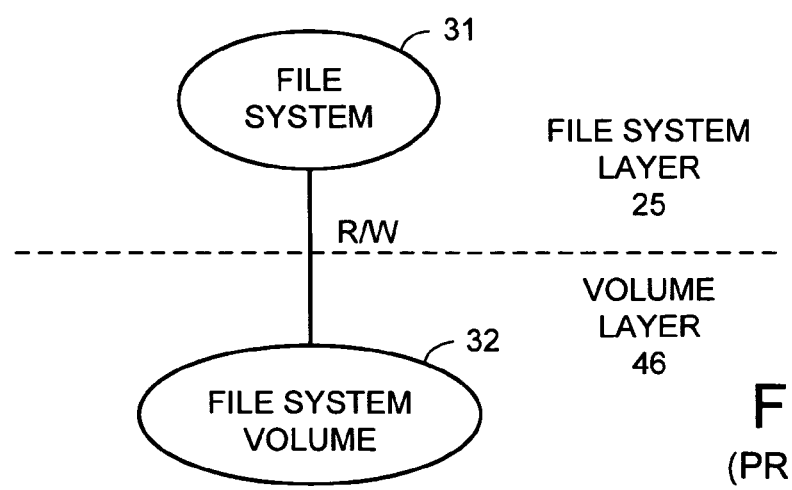
FIG. 2 shows a file system in a file system layer and a file system volume in a volume layer in the network file server of FIG. 1.

FIG. 2 shows that the file system layer 25 includes a file system object 31, which is supported by a file system volume 32 in the volume layer 46. When a client accesses the file system object 31, the file system object 31 reads or writes an extent of data blocks from the file system volume 32. Each data block, for example, is eight kilobytes in size.

Figure 3:
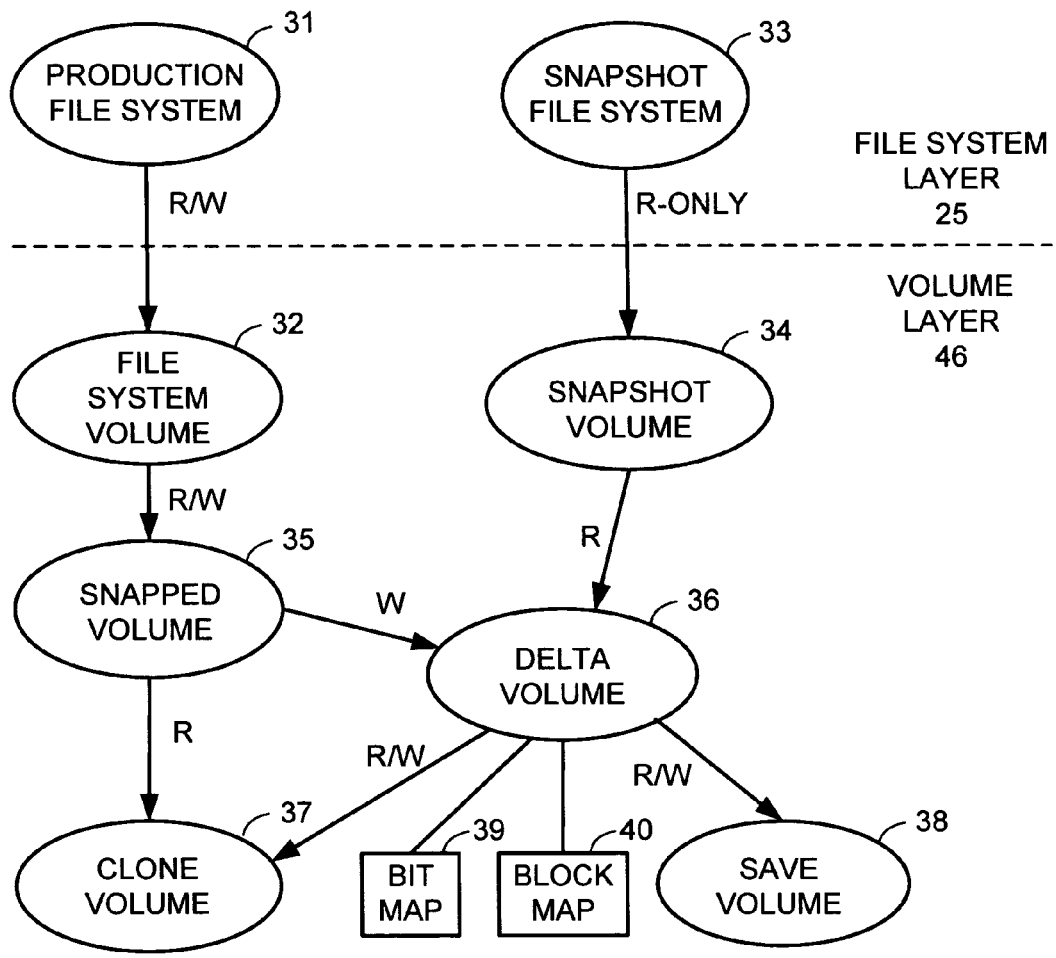
FIG. 3 shows objects in a volume layer to support a production file system and a snapshot file system in the file system layer of the network file server of FIG. 1.

FIG. 3 shows an organization of objects in the volume layer 46 to support a production file system 31 having a corresponding snapshot file system 33. The content of the snapshot file system is the state of the production file system at a particular point in time when the snapshot file system was created. The production file system 31 is supported by read/write access to a file system volume 32. A snapshot file system 33 provides read only access to a snapshot volume 34.

Additional objects in the volume layer 46 of FIG. 3 permit the content of the snapshot file system to be created during concurrent read/write access to the production file system 31. The file system volume 32 is supported by a snapped volume 35 having read access to a clone volume 37 and write access to a delta volume 36. The delta volume 36 has read/write access to the clone volume 37 and read/write access to a save volume 38.

In the organization of FIG. 3, the actual data is stored in blocks in the clone volume 37 and the save volume 38. The delta volume 36 also accesses information stored in a bit map 39 and a block map 40. The bit map 39 indicates which blocks in the clone volume 37 have prior versions in the save volume 38. In other words, for read only access to the snapshot file system, the bit map 39 indicates whether the delta volume should read each block from the clone volume 37 or from the save volume 38. For example, the bit map includes a bit for each block in the clone volume 37. The bit is clear to indicate that there is no prior version of the block in the save volume 38, and the bit is set to indicate that there is a prior version of the block in the save volume 38.

Consider, for example, a production file system 31 having blocks a, b, c, d, e, f, g, and h. Suppose that when the snapshot file system 33 is created, the blocks have values a0, b0, c0, d0, e0, f0, g0, and h0. Thereafter, read/write access to the production file system 31 modifies the contents of blocks a and b, by writing new values a1 and a2 into them. At this point, the following contents are seen in the clone volume 37 and in the save volume 38:

Clone Volume: a1, b1, c0, d0, e0, f0, g0, h0
Save Volume: a0, b0

From the contents of the clone volume 37 and the save volume 38, it is possible to construct the contents of the snapshot file system 33. When reading a block from the snapshot file system 33, the block is read from the save volume 38 if found there, else it is read from the clone volume 37.

In order to reduce the amount of storage allocated to the save volume 38, the storage blocks for the save volume are dynamically allocated on an as-needed basis. Therefore, the address of a prior version of a block stored in the save volume may differ from the address of a current version of the same block in the clone volume 37. The block map 40 indicates the save volume block address corresponding to each clone volume block address having a prior version of its data stored in the save volume.

Figure 4:
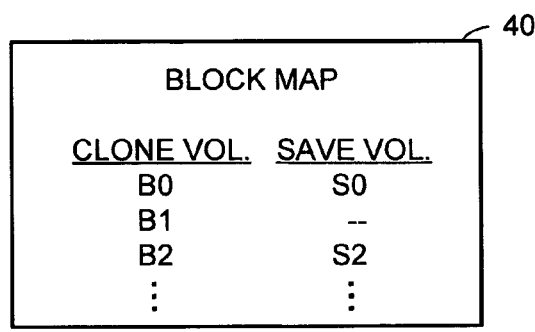
FIG. 4 shows in more detail the block map introduced in FIG. 3.

FIG. 4 shows the block map 40 in greater detail. The block map 40 is a table indexed by the production volume block address (Bi). The table has an entry for each block in the clone volume, and each entry is either invalid if no save volume block has been allocated to the block in the clone volume, or if valid, the entry contains the corresponding save volume block address (Si) of the save volume block containing data copied from the corresponding block in the clone volume.

Figure 5:
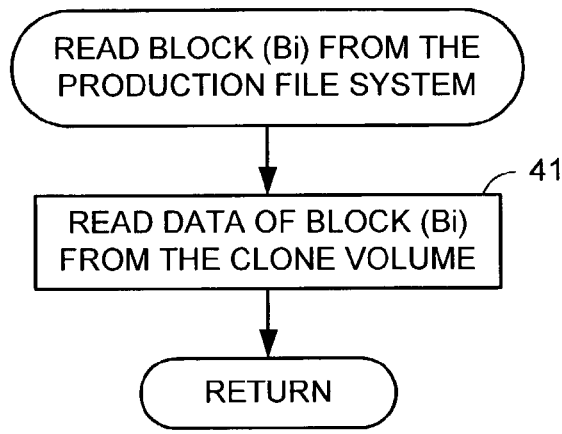
FIG. 5 is a flowchart of a procedure for reading a specified block from the production file system in the network file server.

FIG. 5 shows a procedure for reading a specified block of data from the production file system. In step 41, the specified block of data is read from the clone volume, and execution returns.

Figure 6:
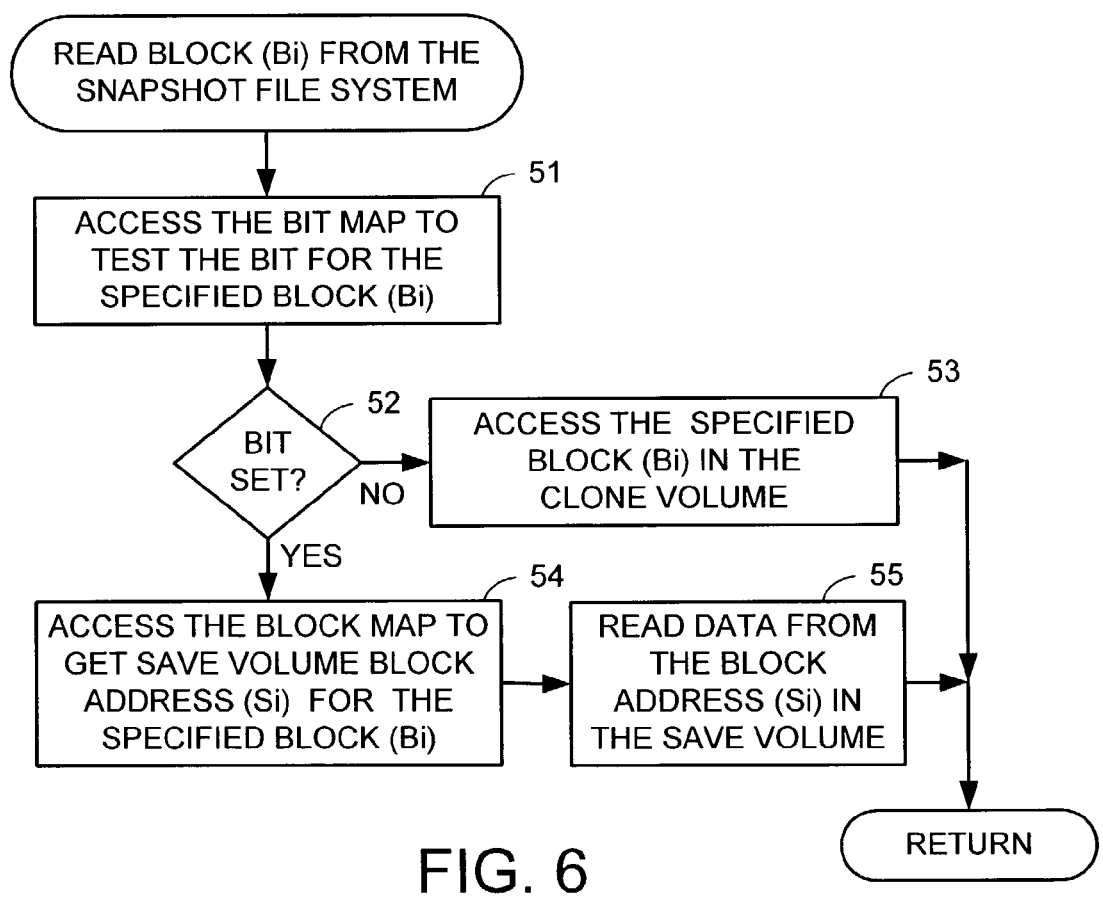
FIG. 6 is a flowchart of a procedure for reading a specified block from the snapshot file system in the network file server.

FIG. 6 shows a procedure for reading a specified block from the snapshot file system. In a first step 51, the bit map is accessed to test the bit for the specified block. If this bit is not set, then in step 52 execution branches to step 53 to access the specified block in the clone volume, and then execution returns.

If in step 52 the bit is set, then execution continues to step 54. In step 54, the block map is accessed to get the save volume block address (Si) for the specified block (Bi). Then in step 55, the data is read from the block address (Si) in the save volume, and execution returns.

Figure 7:
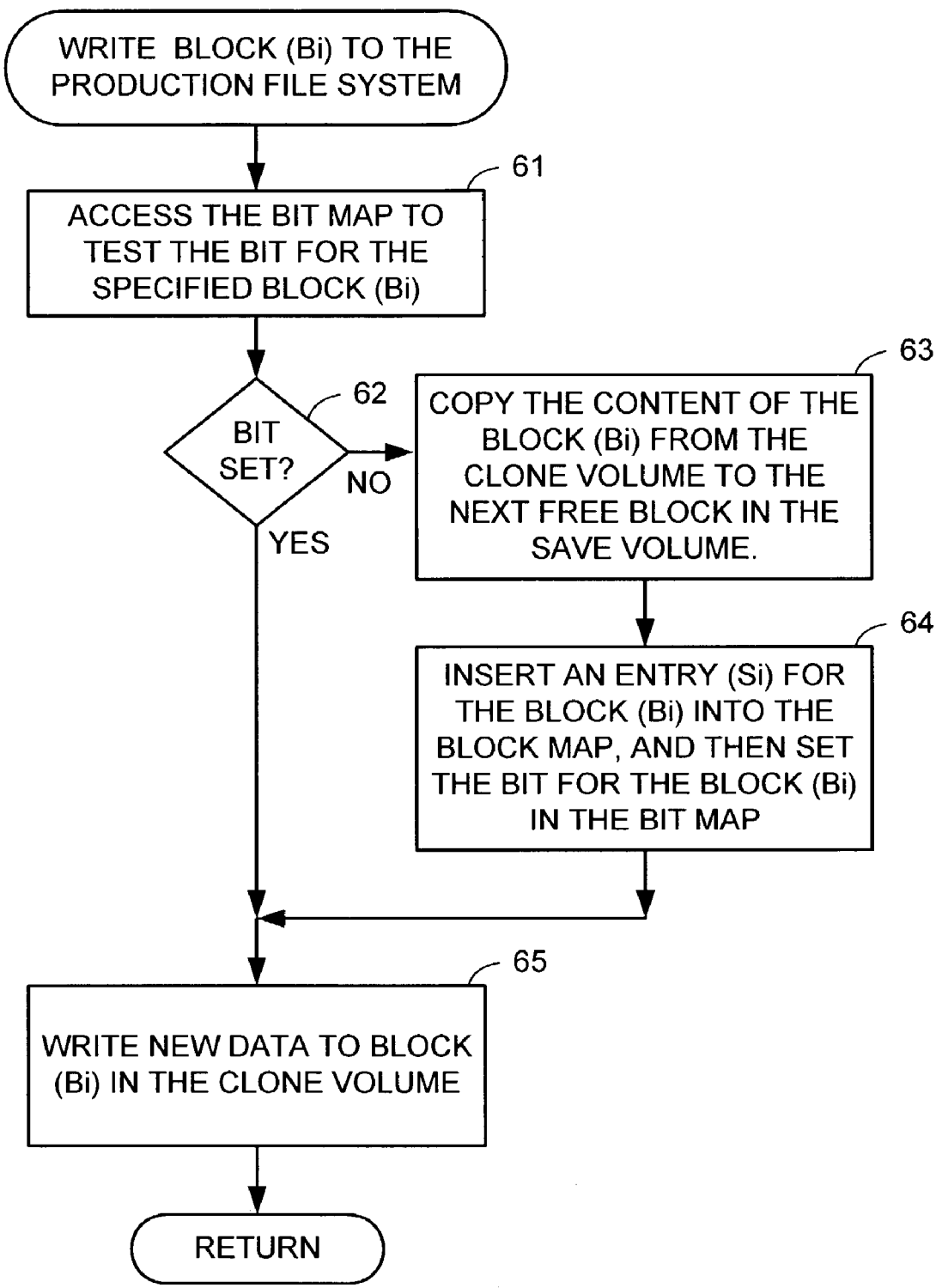
FIG. 7 is a flowchart of a procedure for writing a specified block to the production file system in the network file server.

FIG. 7 shows a procedure for writing a specified block (Bi) of data to the production file system. In a first step 61, the bit map is accessed to test the bit for the specified block (Bi). In step 62, if the bit is not set, then execution branches to step 63. In step 63, the content of the specified block (Bi) is copied from the clone volume to the next free block in the save volume. The copying can be done by copying data from the physical storage location of the specified block (Bi) in the clone volume to the physical storage location of the next free block in the save volume, or the copying can be done by moving a pointer to the physical location of the data for the specified block (Bi) in the clone volume from a logical-to-physical map entry for the specified block (Bi) in the clone volume to a logical-to-physical map entry for the next free block in the save volume. Next in step 64, the save volume block address (Si) of this next free block is inserted into the entry in the block map for the block (Bi), and then the bit for the block (Bi) is set in the bit map. After step 64, execution continues to step 65 to write the new data to the block (Bi) in the clone volume. Execution also continues from step 62 to step 65 if the tested bit is in a set state. In step 65, the new data is written to the block (Bi) in the clone volume. After step 65, execution returns.

Figure 8:
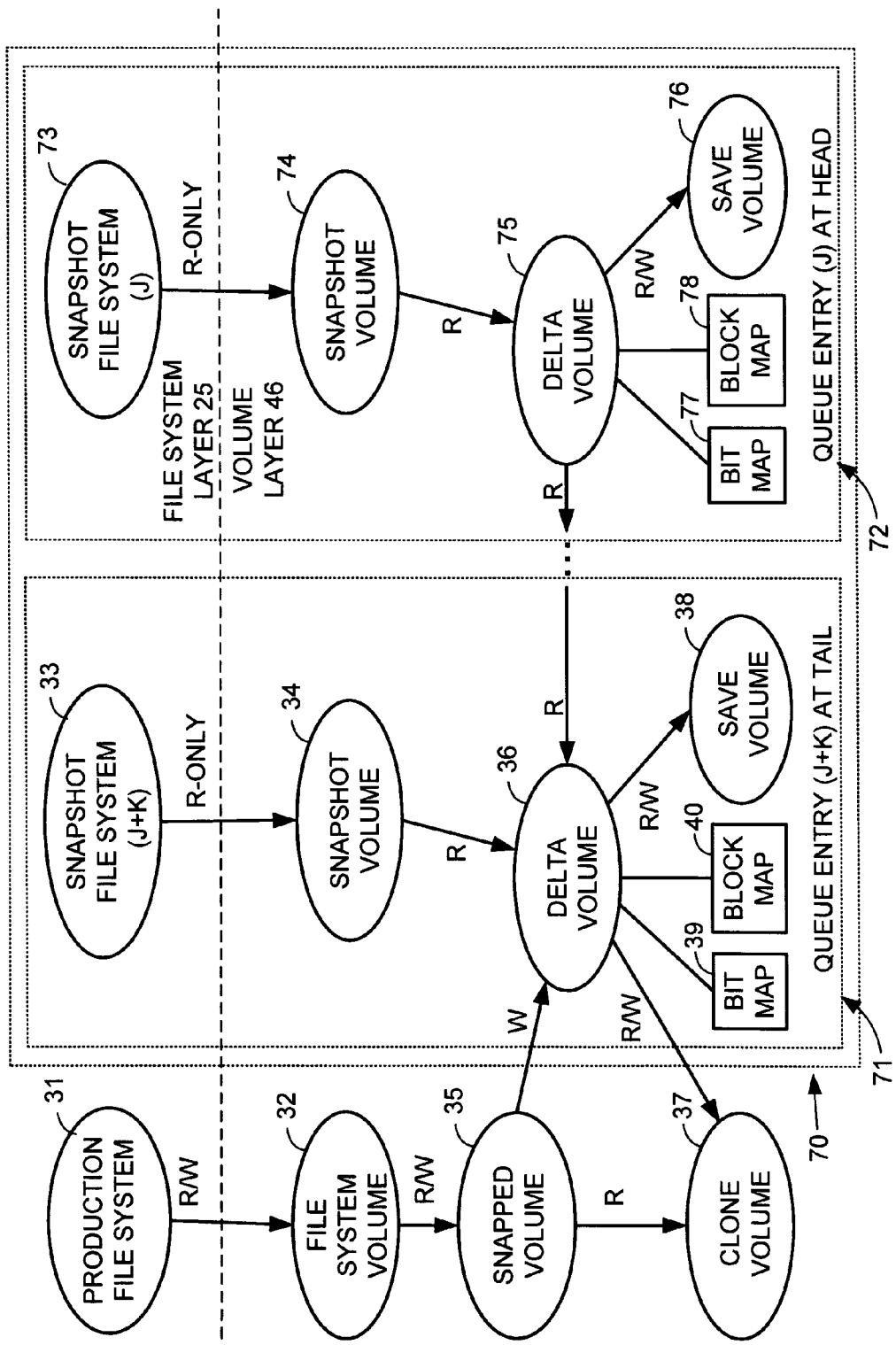
FIG. 8 shows objects in the network file server for maintaining multiple snapshots of the production file system.

FIG. 8 shows the organization of a snapshot queue 70 maintaining multiple snapshot file systems created at different respective points in time from the production file system 31. In particular, the snapshot queue 70 includes a queue entry (J+K) at the tail 71 of the queue, and a queue entry (J) at the head 72 of the queue. In this example, the snapshot file system 33, the snapshot volume 34, the delta volume 36, the save volume 38, the bit map 39, and the block map 40 are all located in the queue entry at the tail 71 of the queue. The queue entry at the head of the queue 72 includes similar objects; namely, a snapshot file system (J) 73, a snapshot volume 74, a delta volume 75, a save volume 76, a bit map 77, and a block map 78.

The network file server may respond to a request for another snapshot of the production file system 31 by allocating the objects for a new queue entry, and inserting the new queue entry at the tail of the queue, and linking it to the snap volume 35 and the clone volume 37. In this fashion, the save volumes 38, 76 in the snapshot queue 71 are maintained in a chronological order of the respective points in time when the snapshot file systems were created. The save volume 76 supporting the oldest snapshot file system 73 resides at the head 72 of the queue, and the save volume 38 supporting the youngest snapshot file system 33 resides at the tail 71 of the queue.

Figure 9:
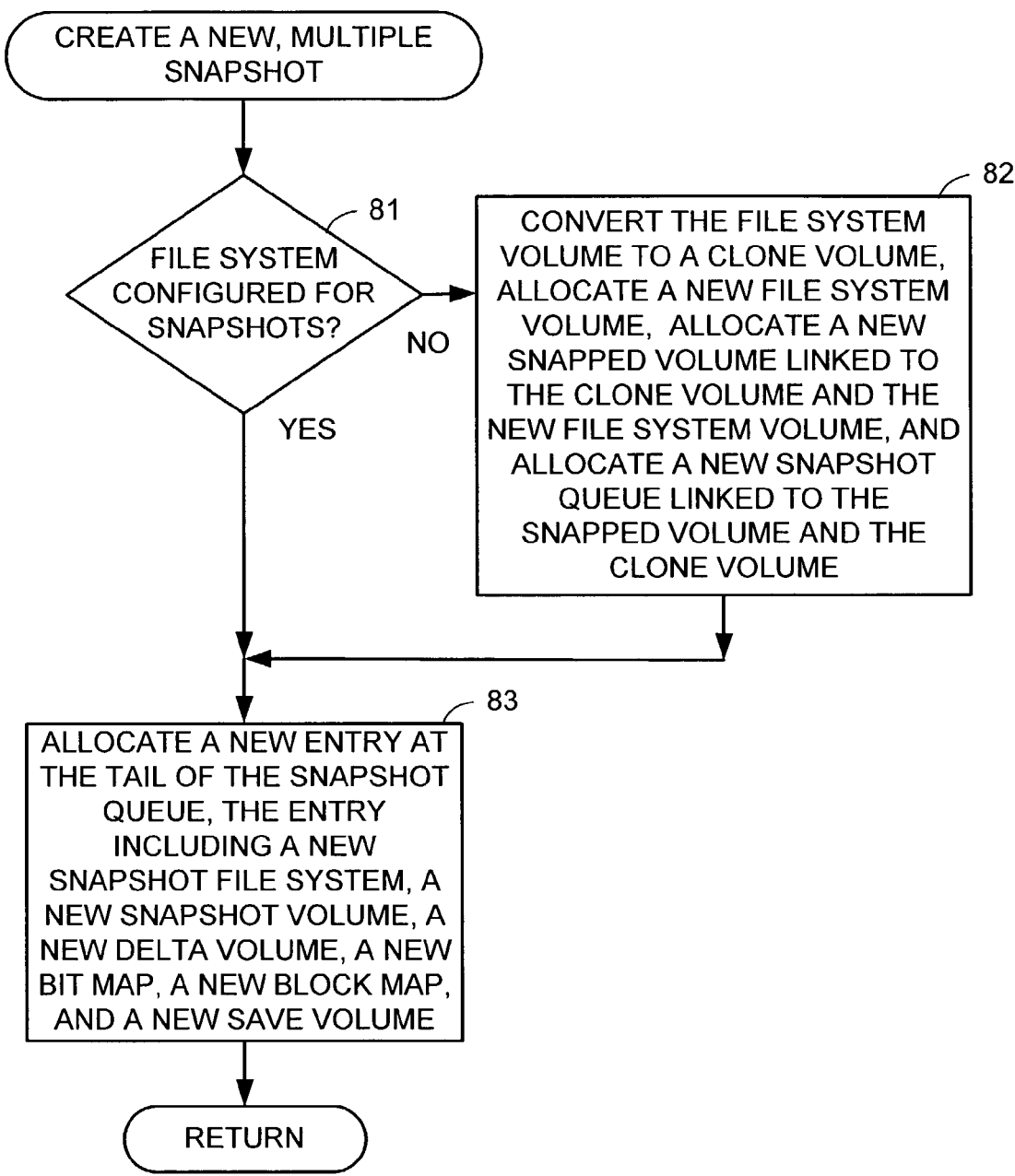
FIG. 9 is a flowchart of a procedure for creating a new snapshot in the network file server when multiple snapshots are organized as shown in FIG. 8.

FIG. 9 shows a procedure for creating a new, multiple snapshot in the organization of FIG. 8. In the first step 81 of FIG. 9, execution branches depending upon whether or not the file system has already been configured for supporting snapshots. If the file system has not been configured for supporting snapshots, then only the file system objects in FIG. 2 will be present. Otherwise, there will at least be a snap volume (35 in FIG. 3) and a clone volume (37 in FIG. 3) associated with the file system.

If in step 81 the file system has not been configured to support snapshots, then execution branches to step 82. In step 82, the data blocks of the original file system volume (32 in FIG. 2) are configured into the clone volume (37 in FIG. 8). A new file system volume is allocated, a new snapped volume is allocated and linked to the clone volume and the new file system volume, and a new snapshot queue is allocated and linked to the snapped volume and the clone volume. Execution continues from step 82 to step 83. Execution also continues from step 81 to step 83 if the file system has already been configured to support snapshots. In step 83 a new entry is allocated at the tail of the snapshot queue. The new entry includes a new snapshot volume, a new delta volume, a new bit map, a new block map, and a new save volume. Upon the successful creation of the new snapshot file system, the new snapshot file system is mounted on the file server. Also during this step, write access on the primary file system is paused, the primary file system is flushed, the snapshot copy process is initiated, and write access on the primary file system is resumed. Read access to the primary file system need not be paused.

Figure 10:
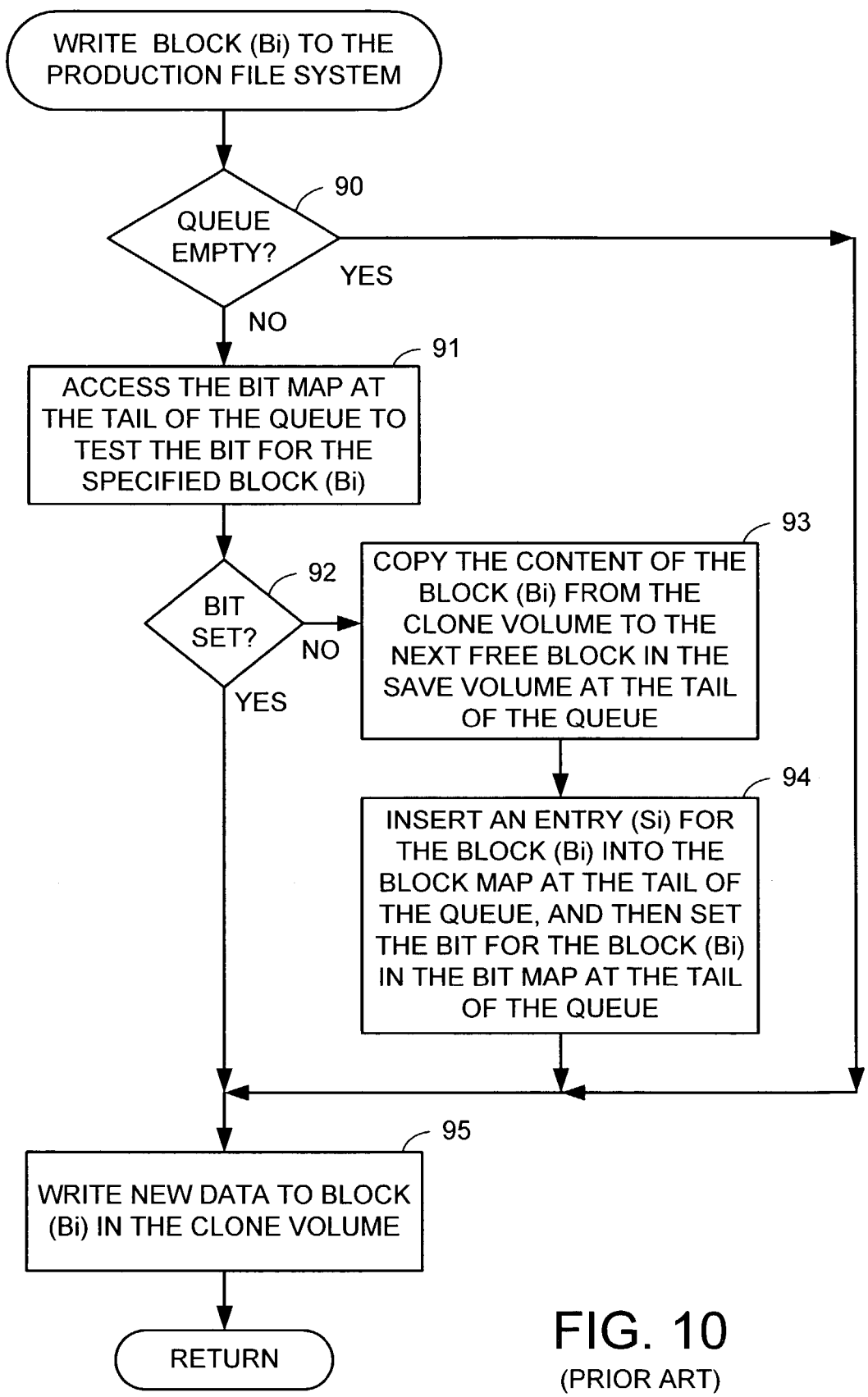
FIG. 10 is a flowchart of a procedure for writing a specified block to the production file system when multiple snapshots are organized as shown in FIG. 8.

FIG. 10 shows a procedure for writing a specified block (Bi) to the production file system. In step 90, if the snapshot queue is not empty, execution continues to step 91. In step 91, the bit map at the tail of the snapshot queue is accessed in order to test the bit for the specified block (Bi). Then in step 92, if the bit is not set, execution branches to step 93. In step 93, the content of the specified block (Bi) is copied from the clone volume to the next free block in the save volume at the tail of the snapshot queue. Execution continues from step 93 to step 94. In step 94, the save volume block address (Si) of the free block is inserted into the entry for the block (Bi) in the block map at the tail of the queue, and then the bit for the block (Bi) is set in the bit map at the tail of the queue. After step 94, execution continues to step 95. Execution also continues to step 95 from step 92 if the tested bit is found to be set. Moreover, execution continues to step 95 from step 90 if the snapshot queue is empty. In step 95, new data is written to the specified block (Bi) in the clone volume, and then execution returns.

Figure 11:
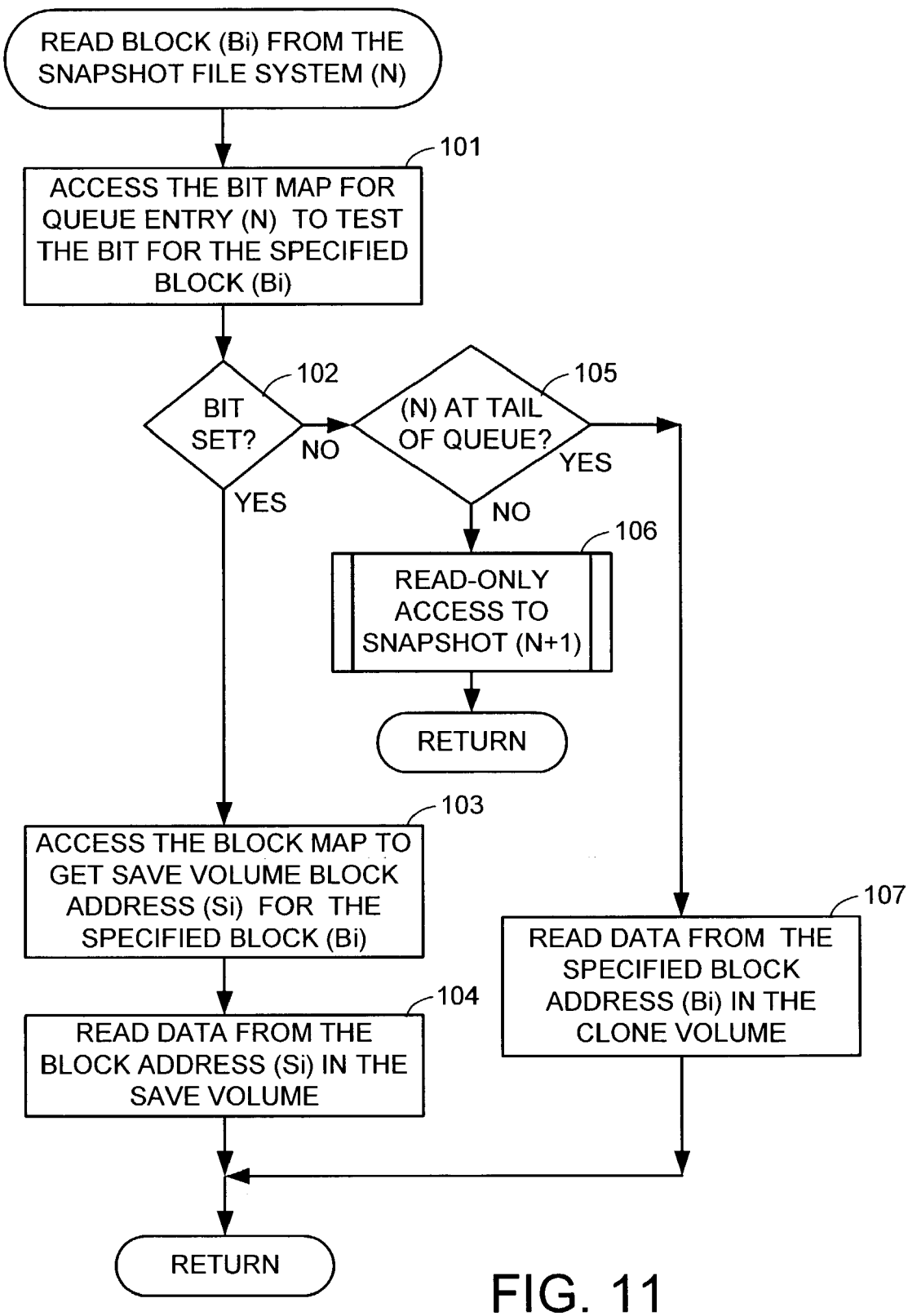
FIG. 11 is a flowchart of a procedure for reading a specified block from a specified snapshot of the production file system when the snapshots are organized as shown in FIG. 8.

FIG. 11 shows a procedure for reading a specified block (Bi) from a specified snapshot file system (N). In the first step 101, the bit map is accessed for the queue entry (N) to test the bit for the specified block (Bi). Then in step 102, if the tested bit is set, execution continues to step 103. In step 103, the block map is accessed to get the save volume block address (Si) for the specified block (Bi). Then in step 104 the data is read from the block address (Si) in the save volume, and then execution returns.

If in step 102 the tested bit is not set, then execution branches to step 105. In step 105, if the specified snapshot (N) is not at the tail of the snapshot queue, then execution continues to step 106 to perform a recursive subroutine call upon the subroutine in FIG. 11 for read only access to the snapshot (N+1). After step 106, execution returns.

If in step 105, if the snapshot (N) is at the tail of the snapshot queue, then execution branches to step 107. In step 107, the data is read from the specified block (Bi) in the clone volume, and execution returns.

Figure 12:
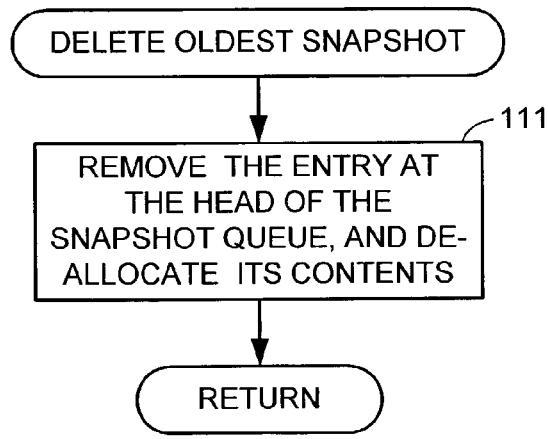
FIG. 12 is a flowchart of a procedure for deleting the oldest snapshot of a production file system when multiple snapshots are organized as shown in FIG. 8.

FIG. 12 shows a procedure for deleting the oldest snapshot in the organization of FIG. 8. In a first step 111, the entry at the head of the snapshot queue is removed, and its contents are de-allocated. Then execution returns.

Figure 13:
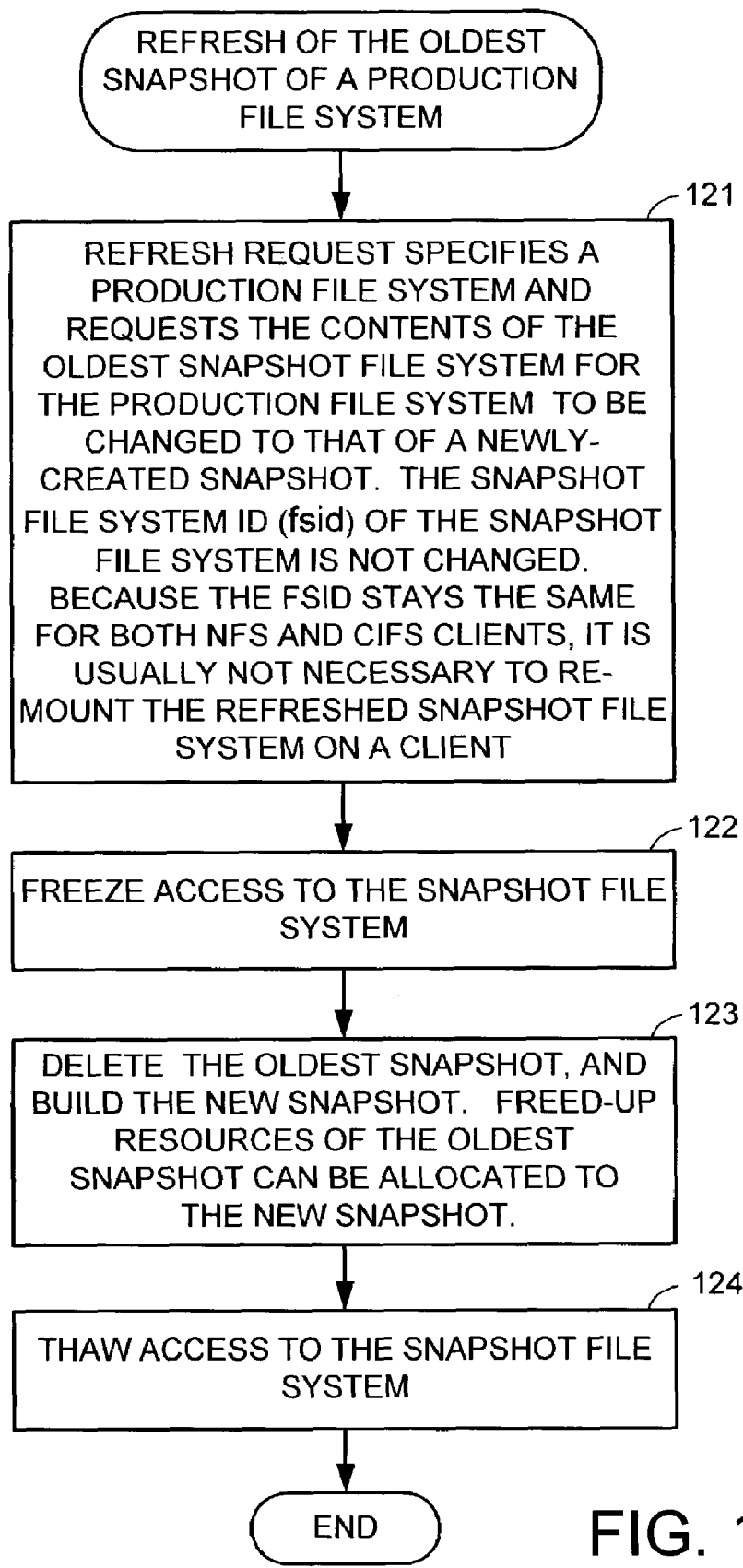
FIG. 13 is a flowchart of a procedure for refreshing the oldest snapshot of the production file system.

FIG. 13 shows a procedure for refreshing the oldest snapshot of the production file system with the current state of the production file system. In a first step 121, the network file server receives a refresh request that specifies a production file system and requests the contents of the oldest snapshot file system for the production file system to be changed to that of a newly-created snapshot. The snapshot file system identifier (fsid) of the snapshot file system is not changed. Because the "fsid" stays the same for both Network File System (NFS) and Common Internet File System (CIFS) clients, it is usually not necessary to re-mount the refreshed snapshot file system on a client. This is very useful, for example, for a system administrator who wants to create a snapshot file system each day during the week, without having to redefine the snapshot file system in mount or export tables on the NFS or CIFS clients.

In step 122, access to the snapshot file system is frozen. Then in step 123, the oldest snapshot is deleted, and the new snapshot is built. Freed-up resources of the oldest snapshot can be allocated to the new snapshot. In step 124, access to the snapshot file system is thawed. This completes the refresh of the oldest snapshot of the production file system.

II. Client-Server Protocol for Directory Access of Snapshot File Systems in a Storage System It is advantageous to store and organize a production file system and its snapshot file systems in the network file server in a way that is different from the way in which they appear to a user, such as a client of the network file server. For example, the production file system and its related snapshot file systems are grouped together and configured or otherwise placed at the volume level in layered programming of the file server. When the this file system group is mounted, a virtual root is created containing the snapshot file systems, e.g., the snapshot file systems have the respective path names/.ckpt_FS1, /.ckpt_FS2, /.ckpt_FS3, etc., with respect to the virtual root. The user can "mount" any selected one of these snapshot file systems by referencing the respective path name. Once each of the snapshot file systems has been mounted, it has a unique file system identifier (fsid). In addition, each of the snapshot file system is given the same file identifier (fid). It is possible to do this internally within the file server because the "fid" (which is used herein as a contraction for the term "fileid" used in the NFS specification, RFC 1094) need only be a number that uniquely identifies the file within its file system, which is specified by the "fsid" attribute of the file. However, this is directly opposite to what a user would expect. Since the snapshots are related and are in the same directory, a user would expect each snapshot file system to have the same "fsid" and a different "fid".

As shown in FIG. 14, the file system layer 25 includes a network file system (NFS) client-server protocol layer 131 layered over the production file system 31 and the snapshot file systems 33 and 73. However, there is an interconnection 132 between the NFS client-server protocol layer 131 and the file systems 31, 33, and 73 that interchanges the "fsid" and the "fid" for the file systems in the file system group.

In FIG. 14, "fsid'" and "fid'" represent the file system identifier and the file identifier, respectively, of the file systems 31, 33, and 73 as internally stored in the file system layer 25. The internal file identifier (fid') for the production file system 31 and each of the snapshot file systems 33, and 73 is set to the file system identifier (fsid) of the parent file system of the production file system (PFS_parent). As used in the NFS protocol layer, the production file system 31 appears to have a file identifier (fid) equal to the internal file system identifier (fsid') of the production file system 31 (PFS). As used in the NFS protocol layer, the snapshot file system (J+K) 33 appears to have a file identifier (fid) equal to the internal file system identifier (fsid') of the snapshot file system (J+K) 33 (.ckpt_[J+K]). As used in NFS protocol layer, the snapshot file system (J) 73 appears to have a file identifier (fid) equal to the internal file system identifier (fsid') of the snapshot file system (J) 73 (.ckpt_J). In effect, the NFS protocol layer 131 has been reprogrammed so that once it recognizes a ".ckpt" identification in the pathname to an object in a file system, it switches the "fsid" and the "fid" of the file system. For example, as seen by the NFS client-server protocol layer 131, the file systems 31, 33, and 73 appear to have the same "fsid", namely, the "fsid" of the parent of the production file system 31. In contrast, the internal storage of the file systems 31, 33, and 73 is such that these file systems in the file system group have the same internal file identifier (fid'), which as been set to the "fsid" of the parent of the production file system 31. Moreover, each of the production file system 31, the snapshot file system (J+K) 33, and the snapshot file system (J) 73 appear to the NFS client-server protocol layer 131 to have a different "fid", namely, the production file system 31 appears to have a "fid" indicating the production file system, the snapshot file system (J+K) 33 appears to have a "fid" indicating the snapshot file system (J+K), and the snapshot file system (J) 73 appears to have a "fid" indicating the snapshot file system (J).

In accordance with another aspect of the invention, the "fsid" and "fid" for the various file systems in the file system group are encoded into the file handle for an object in a file system of the file system group. This file handle is passed between the network client and the network file server in a conventional fashion, as shown in FIG. 15, but it is used for accessing the object in the file system group in a very efficient way, as further described below with reference to FIGS. 16 to 19.

Figure 15:
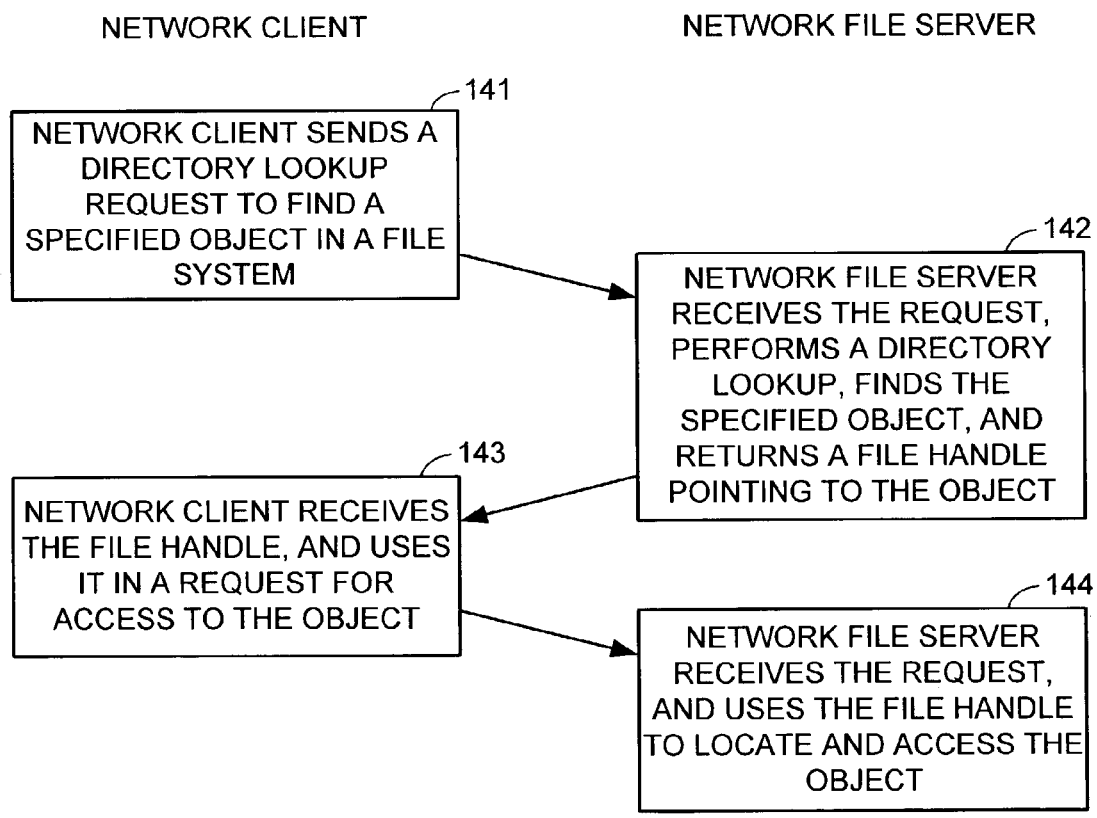
FIG. 15 is a flow diagram showing the conventional use of a file handle in a client-server protocol.

As shown in FIG. 15, in order for a network client to access an object in a network file server using the NFS protocol, a number of messages are passed between the network client and the network file server. NFS is described, for example, in RFC 1094, Sun Microsystems, Inc., "NFS: Network File Systems Protocol Specification," Mar. 1, 1989. In a first step 141, the network client sends a directory lookup request to the network file server to find a specified object in a file system. Then, in step 142, the network file server receives the directory lookup request from the network client. The network file server performs a directory lookup, finds the specified object, and returns a file handle pointing to the object. In step 143, the network client receives the file handle, and uses the file handle in a request for access to the object. In step 144, the network file server receives the access request from the network client, and uses the file handle in the request to locate and access the object.

In the NFS protocol, the file handle is opaque to the client, in the sense that the client does not need to know what, if anything, is indicated by the contents of the file handle. For the file server, the file handle need only identify the location of the object. However, the content of the file handle can be selected in such a way so as to facilitate access to the object.

In a preferred implementation, a production file system can be configured to have related snapshot file systems. Once so configured, a request to mount the production file system is interpreted as a request to mount the production file system and all of its related snapshot file systems. When a client requests a file handle for an object (such as a file, directory, or link) in the mounted production file system, the re-programmed NFS protocol layer returns a 32-byte file handle. (NFS supports a file handle having up to 64 bytes.) The 32-byte file handle from the re-programmed NFS protocol layer is the concatenation of a 16-byte mount handle for the file system group, and a 16-byte file handle for the object in a particular production file system or snapshot file system in the file system group.

Figure 16:
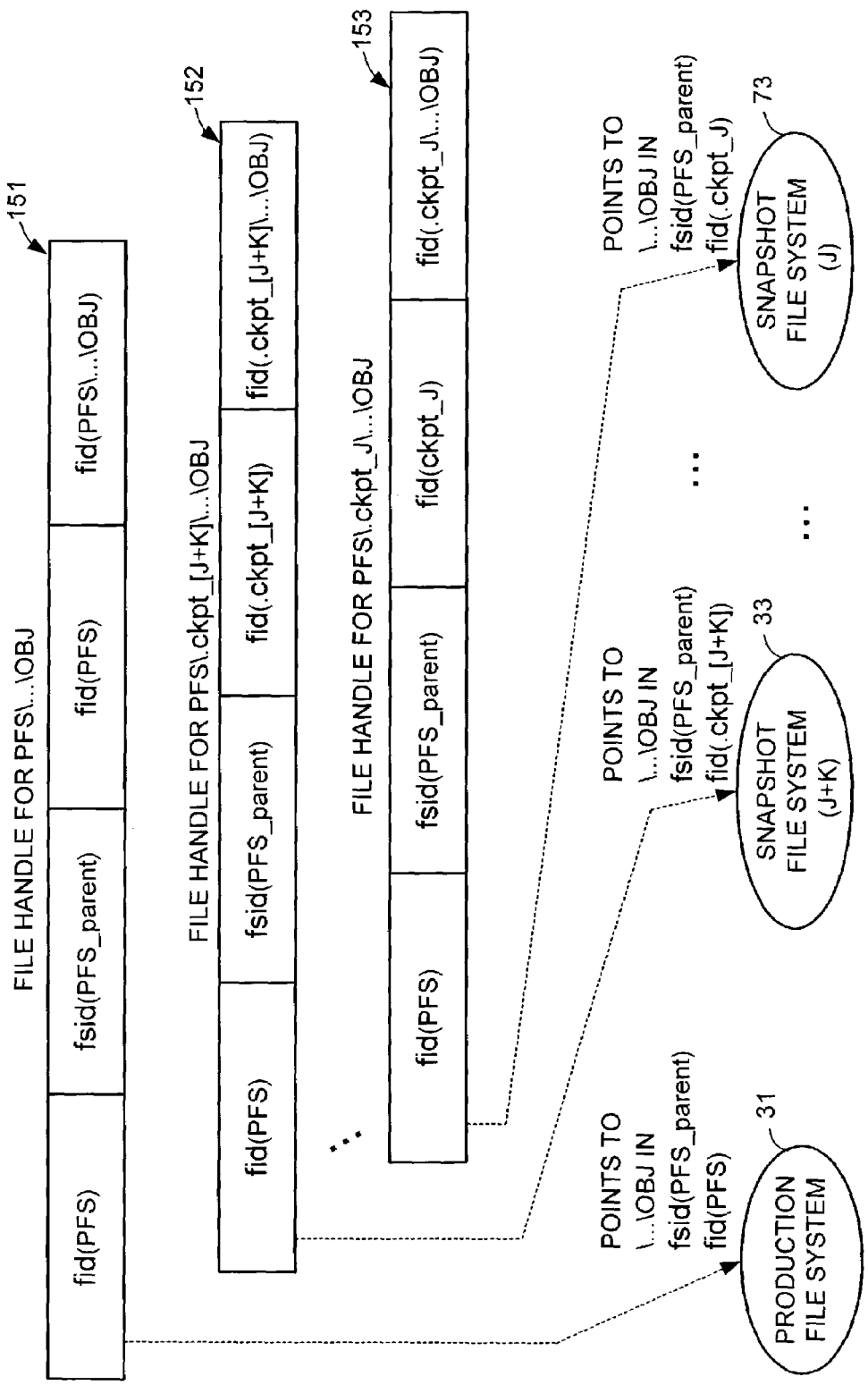
FIG. 16 shows the preferred content of respective file handles for an object as found in a production file system, and as found in related snapshot file systems in a file system group.

FIG. 16 shows the preferred way of encoding the various "fid" and "fsid" in respective file handles 151, 152, 153 pointing to an object residing in the production file system 31, the snapshot file system (J+K) 33, and the snapshot file system (J) 73. For the version of the object in the production file system 31, the network file server performs successive directory lookup requests upon the object path name ("PFS\ . . . \OBJ") to produce a 32-byte NFS file handle 151. The file handle 151 includes a first 8-byte sub-block including the "fid" of the production file system 31, a second 8-byte sub-block including the "fsid" of the parent file system containing the production file system 31, a third 8-byte sub-block including the "fid" of the production file system 31, and a fourth 8-byte sub-block including the "fid" of the object as the object is found in the production file system 31. The first two 8-byte sub-blocks of the file handle 151 in effect are a 16-byte mount handle for the file system group, and the second two 8-byte sub-blocks in effect are a 16-byte file handle for the object in the production file system 31.

The NFS file handle 152 for the object as specified by the path name "PFS\.ckpt_[J+K]\ . . . \OBJ" has a first 8-byte sub-block including the "fid" of the production file system 31, a second 8-byte sub-block including the "fsid" of the parent file system containing the production file system 31, a third 8-byte sub-block including the "fid" of the snapshot file system (J+K) 33, and a fourth 8-byte sub-block including the "fid" of the object as found in the snapshot file system (J+K) 33. The first two 8-byte sub-blocks of the file handle 152 in effect are a 16-byte mount handle for the file system group, and the second two 8-byte sub-blocks in effect are a 16-byte file handle for the object in the file system (J+K) 33.

The network file server decodes the object pathname "PFS\ckpt_J\ . . . \OBJ" to produce a NFS file handle 153 including a first 8-byte sub-block including the "fid" of the production file system 31, a second 8-byte sub-block including the "fsid" of the parent file system containing the production file system 31, a third 8-byte sub-block including the "fid" of the snapshot file system (J) 73, and a fourth 8-byte sub-block including the "fid" of the object as found in the snapshot file system (J) 73. The first two 8-byte sub-blocks of the file handle 153 in effect are a 16-byte mount handle for the file system group, and the second two 8-byte sub-blocks in effect are a 16-byte file handle for the object in the file system (J) 73.

Figure 17:
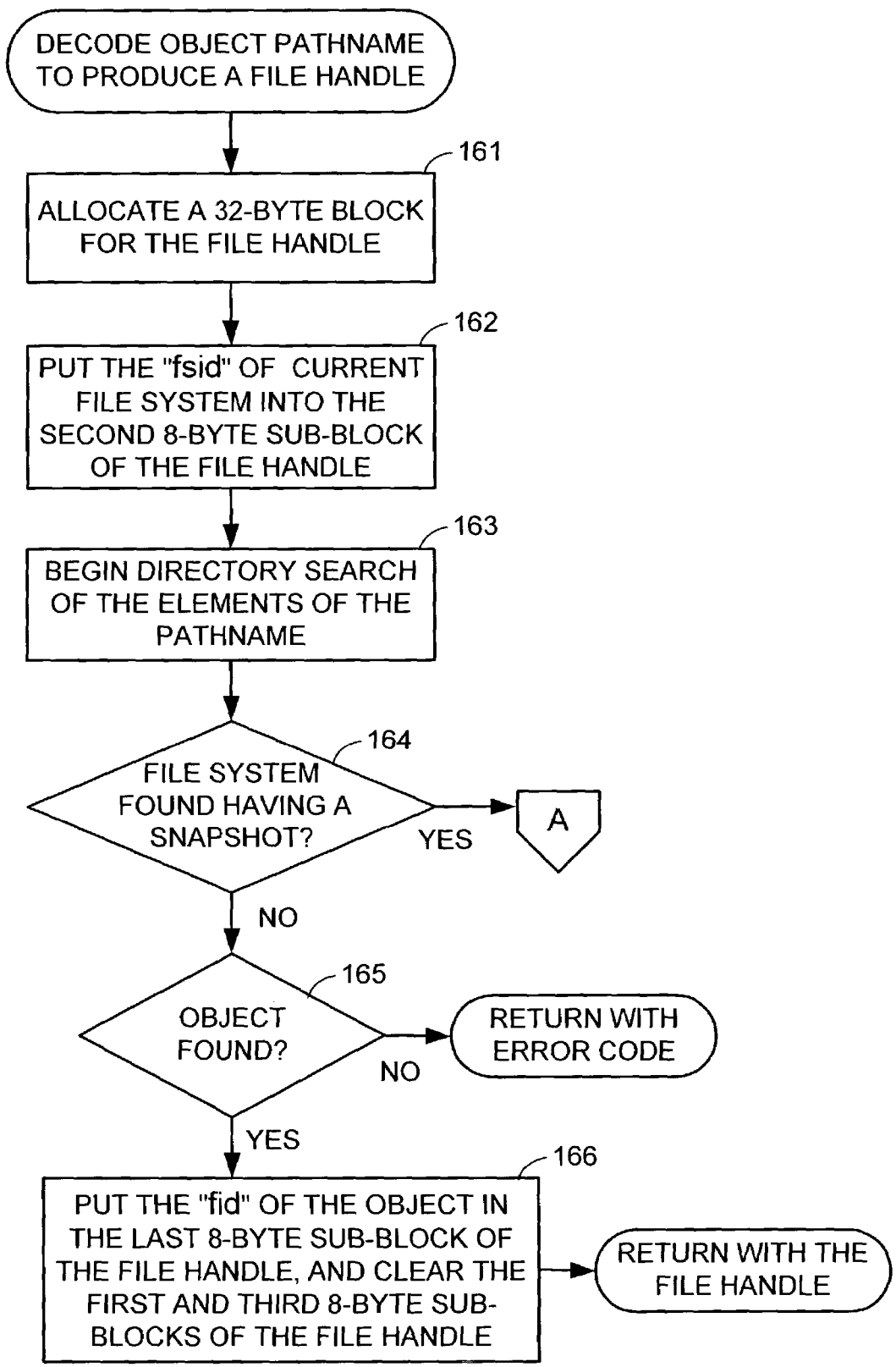
FIG. 17 is a flowchart showing how the network file server is programmed to decode an object pathname to produce a file handle.

FIG. 17 shows a flowchart for decoding an object pathname to produce a file handle pointing to the object. In a first step 161, a 32-byte block is allocated for the file handle. In step 162 the "fsid" of the current file system is put into the second 8-byte sub-block of the file handle. In step 163, the network file server begins a directory search of the elements of the pathname. During this search, if an element in the pathname is not a file system that is found to be configured to have at least one snapshot, then execution continues from step 164 to step 165. In step 165, if the object is not found in the directory search, then execution returns with an error code. Otherwise, execution continues to step 166 to put the "fid" of the object in the last 8-byte sub-block of the file handle, and to clear the first and third 8-byte sub-blocks of the file handle. Execution then returns with the 32-byte file handle.

Figure 18:
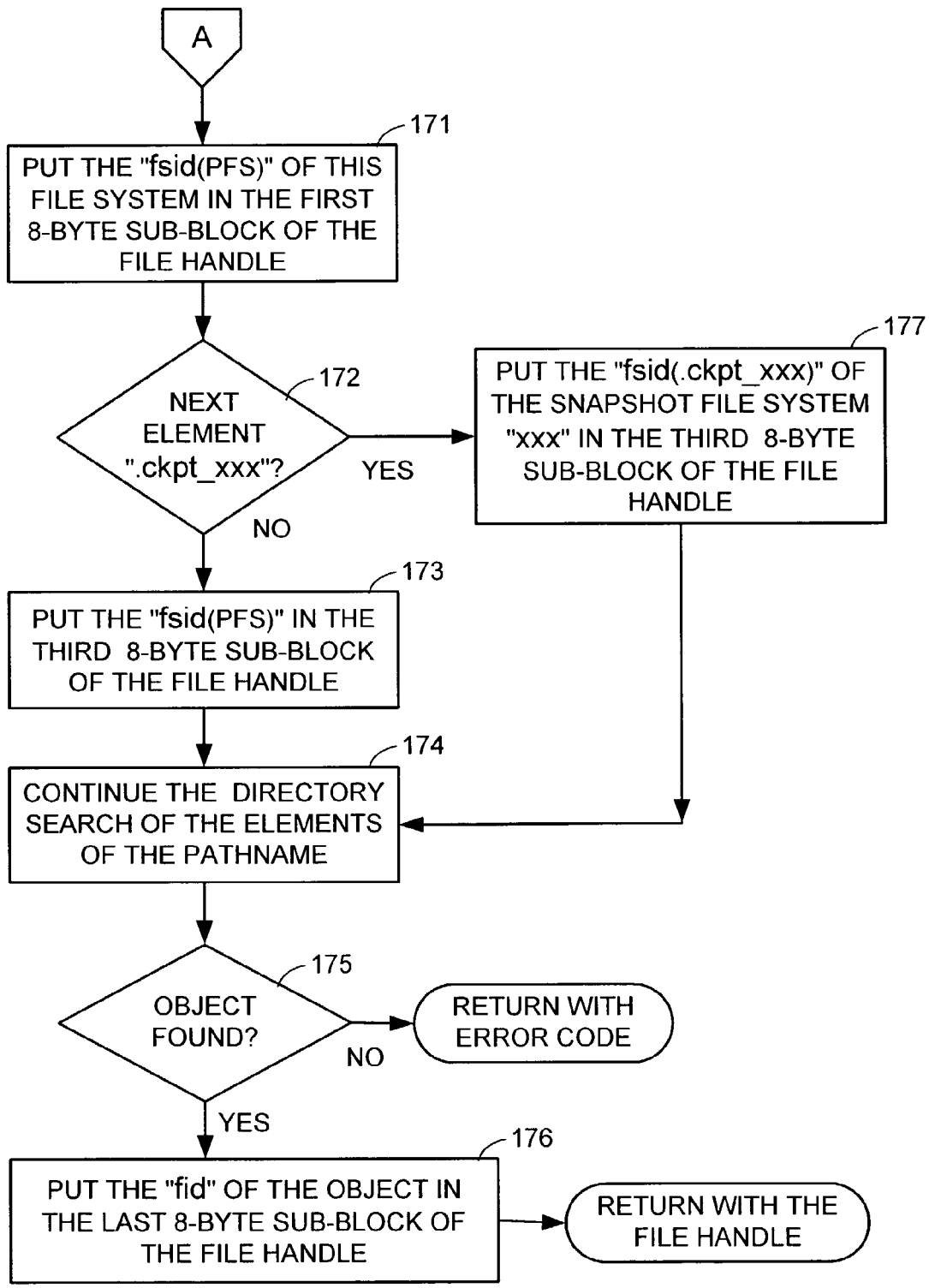
FIG. 18 is a continuation of the flowchart begun in FIG. 17.

If in step 164 an element of the pathname has been found to be a file system configured to have at least one snapshot, then execution continues to step 171 in FIG. 18. In step 171 the network file server puts the "fsid" of this production file system into the first 8-byte sub-block of the file handle. Then, in step 172, execution continues to step 173 if the next element of the pathname does not have the form ".ckpt_xxx", where "xxx" is an identifier for a snapshot file system. In step 173, the network file server puts the "fsid" of the production file system in the third 8-byte sub-block of the file handle. Then in step 174, the network file server continues the directory search of the elements of the pathname. In step 175, if the object is not found, then execution returns with an error code. Otherwise, execution continues from step 175 to step 176. In step 176, the network file server puts the "fid" of the object in the last 8-byte sub-block of the file handle, and then execution returns with the file handle.

If in step 172, the next element has the format ".ckpt_xxx", then execution branches to step 177 to put the "fsid" of the snapshot file system "xxx" in the third 8-byte sub-block of the file handle. Execution continues from step 177 to step 174.

Figure 19:
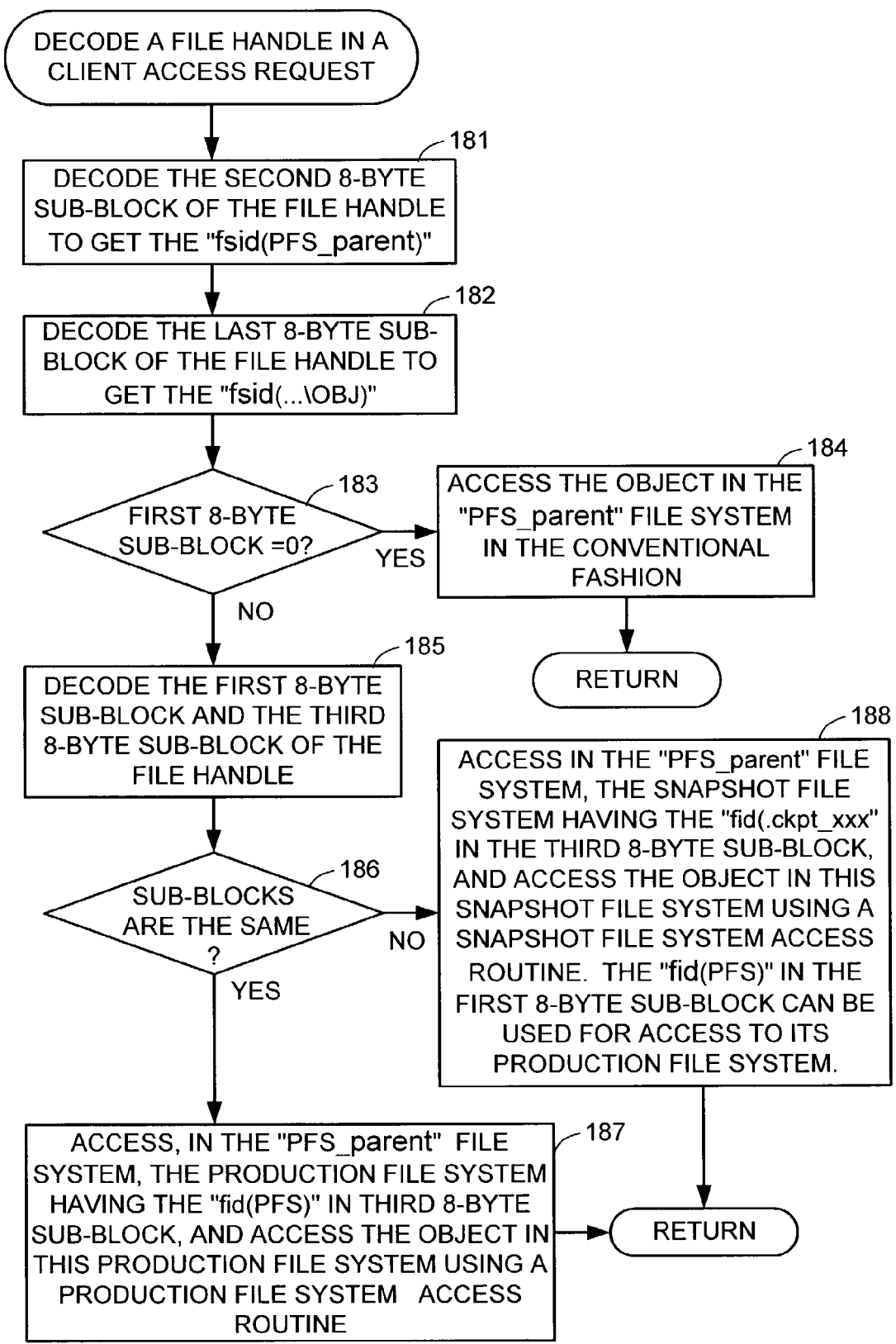
FIG. 19 is a flowchart showing the decoding of a file handle in a client request for access to a file system object in the network file server.

FIG. 19 shows a procedure executed by the network file server for decoding a file handle in a client access request. In a first step 181, the network file server decodes the second 8-byte sub-block of the file handle to get the "fsid" of a parent file system. Next, in step 182, the network file server decodes the last 8-byte sub-block of the file handle to get the "fsid" of the object. Then, in step 183, execution branches depending on whether or not the first 8-byte sub-block is equal to zero. If the first 8-byte sub-block is equal to zero, then execution branches to step 184. In step 184, the network file server accesses the object in the parent file system in the conventional fashion, then execution returns.

If in step 183 the first 8-byte sub-block of the file handle is not equal to zero, then execution continues to step 185. In step 185, the network file server decodes the first 8-byte sub-block and the third 8-byte sub-block of the file handle. In step 186, if the first 8-byte sub-block is the same as the third 8-byte sub-block, then execution continues from step 186 to step 187. In step 187, the network file server accesses, in the parent file system, the production file system having the "fid" of the production file system 8-byte sub-block, and then accesses the object in this production file system using a production file system access routine, such as the routine in FIG. 5 for reading a specified block from the production file system, and the routine of FIG. 7 or FIG. 10 for writing a specified block to the production file system. Execution then returns.

If in step 186, the first 8-byte sub-block is not the same as the third 8-byte sub-block, then execution branches from step 186 to step 188. In step 188, the network file server accesses in the parent file system (identified by the second 8-byte sub-block of the file handle), the snapshot file system identified by the "fid" in the third 8-byte sub-block, and then accesses the object in this snapshot file system using a snapshot file system access routine, such as the routine shown in FIG. 6 or in FIG. 11 for reading a specified block from the snapshot file system. Moreover, the file identifier in the first 8-byte sub-block can be used for accessing the production file system corresponding to the snapshot file system. After step 188, execution returns.

FIG. 20 shows encoding and decoding of a file handle 191 for an object in a file system (FS) that is not configured for having related snapshot file systems. In this case, the first 8-byte sub-block (BLK1) is zero, the second 8-byte sub-block (BLK2) is the "fsid" of the file system (FS), the third 8-byte sub-block (BLK3) is zero, and the fourth 8-byte sub-block (BLK4) is the "fid" of the object in the file system (FS). The file handle is determined to indicate an object in a file system that is not configured for having snapshot file systems when the first block is found to be equal to zero (i.e., BLK1.EQ.0 is true).

FIG. 21 shows encoding and decoding of a file handle 151 for the object (OBJ) in the production file system (PFS) that is configured for having related snapshot file systems. In this case, the first 8-byte sub-block (BLK1) is the "fid" of the production file system (PFS) as found in its parent file system (PFS_parent) the second 8-byte sub-block (BLK2) is the "fsid" of the parent file system (PFS_parent), the third 8-byte sub-block (BLK3) is the "fid" of the production file system (PFS) as found in the parent file system (PFS_parent), and the fourth 8-byte sub-block (BLK4) is the "fid" of the object (OBJ) as found in the production file system (PFS). The file handle is determined to indicate an object in a production file system that is configured for having snapshot file systems when the first block is found to be not equal to zero and the first block is found to be equal to the second block (i.e., BLK1.NE.0 AND BLK1.EQ.BLK3 is true).

FIG. 22 shows encoding and decoding of the file handle 153 for the object (OBJ) in the snapshot file system (.ckpt_J). In this case, the first 8-byte sub-block (BLK1) is the "fid" of the snapshot's production file system (PFS) as found in its parent file system (PFS_parent), the second 8-byte sub-block (BLK2) is the "fsid" the parent file system (PFS_parent), the third 8-byte sub-block (BLK3) is the "fid" of the snapshot file system (.ckpt_J) as found in the parent file system (PFS_parent), and the fourth 8-byte sub-block (BLK4) is the "fid" of the object (OBJ) as found in the snapshot file system (.ckpt_J). The file handle 153 is determined to indicate an object in a snapshot file system when the first block is found to be not equal to zero and the first block is found to be not equal to the second block (i.e., BLK1.NE.0 AND BLK.NE.BLK3 is true).

In view of the above, there has been described an improved way of organizing and accessing snapshot file systems in storage. Internally, a production file system and each of its related snapshot file systems have a common file identifier (fsid') and a unique respective file system identifier (fsid'). When referenced externally by a path name to an object in a snapshot file system, a directory access protocol interprets the path name to obtain an external file system id of the production file system, and an external file system id of the snapshot file system. The external file system id of the production file system is used as the internal file identifier for the production file system, and the external file system id of the snapshot file system is used as the internal file identifier for the snapshot file system. For example, an NFS client-server protocol layer is re-programmed to convert between the external references and the internal references by interchanging the "fsid" and the "fid" for the production file system and each of the snapshot file systems. The internal file id (fid'), which is the same for the production file system and each of the related snapshot file systems, is used as the external file system id (fsid) of the root file system including the production file system and the related snapshot file system. The respective internal file system id (fsid') of the production file system and each of the related snapshot file systems is used as the respective external file id (fid) of the production file system and each of the related snapshot file systems. Moreover, when the directory access is performed to obtain a file handle, the file handle indicates that this switch has been made between the "fsid" and "fid". In particular, the file handle for an object indicates whether or not an object is in either a production file system that is not configured to have related snapshot file systems, a production file system that is configured to have related snapshot file systems, or a snapshot file system. When the object is in a snapshot file system, the file handle for the object indicates not only the snapshot file system but also the related production file system.

What is claimed is:

1. A computer-implemented method of accessing a group of related snapshot file systems stored in an electronic data storage system, each of the related snapshot file systems being the state of a production file system at a respective point in time, each of the related snapshot file systems having been configured to have a common internal file identifier (fid') and a different respective internal file system identifier (fsid'), wherein said computer-implemented method comprises:

decoding a pathname to an object in one of the related snapshot file systems in accordance with a file access protocol, the decoding of the pathname to the object selecting a common external file system identifier (fsid) for the group of related snapshot file systems, the common external file system identifier (fsid) for the group of related snapshot file systems being the common internal file identifier (fid'), and selecting a respective external file identifier (fid) distinguishing said one of the related snapshot file systems from the other related snapshot file systems in the group of related snapshot file systems, and selecting a file identifier for the object within said one of the related snapshot file systems; and accessing the object in said one of the related snapshot file systems by using the common external file system identifier (fsid) for the group of related snapshot file systems to select the group of related snapshot file systems from within the electronic data storage system, using the external file identifier (fid) distinguishing said one of the related snapshot file systems from the other related snapshot file systems in the group of related snapshot file systems as the internal file system identifier (fsid') to select said one of the related snapshot file systems stored in the electronic data storage system from within the selected group of related snapshot file systems, and using the file identifier for the object within said one of the related snapshot file systems to select and access the object from within said one of the related snapshot file systems.

2. The computer-implemented method as claimed in claim 1, wherein the production file system is stored in the electronic data storage system, the production file system has been configured to have the common internal file identifier (fid') and an internal file system identifier (fsid'), and wherein said method further includes:

decoding a pathname to the object in the production file system in accordance with the file access protocol, the decoding of the pathname to the object selecting the common external file system identifier (fsid) for the group of related snapshot file systems, and selecting an external file identifier (fid) distinguishing the production file system from the related snapshot file systems in the group of related snapshot file systems, and selecting a file identifier for the object within the production file system; and accessing the object in the production file system by using the common external file system identifier (fsid) for the group of related snapshot file systems to select the group of related snapshot file systems from within the electronic data storage system, using the external file identifier (fid) distinguishing the production file system from the related snapshot file systems in the group of related snapshot file systems as the respective internal file system identifier (fsid') to select the production file system stored in the electronic data storage system from within the selected group of related snapshot file systems, and using the file identifier for the object within the production file system to select and access the object from within the production file system.

3. The computer-implemented method as claimed in claim 1, wherein the decoding of the pathname is performed in a client-server protocol that produces a file handle indicating a location for the object in said one of the related snapshot file systems in the electronic data storage system, and the accessing of the object is performed in the client-server protocol by using the file handle for locating the object in said one of the related snapshot file systems in the electronic data storage system.

4. The computer-implemented method as claimed in claim 3, wherein the client-server protocol is the Network File System (NFS) client-server protocol.

5. The computer-implemented method as claimed in claim 3, wherein the file handle indicating the location for the object in said one of the related snapshot file systems in the electronic data storage system includes the common external file system identifier (fsid) for the group of related snapshot file systems, the respective external file identifier (fid) distinguishing said one of the related snapshot file systems from the other related snapshot file systems in the group of related snapshot file systems, and the file identifier for the object within said one of the related snapshot file systems.

6. The computer-implemented method as claimed in claim 5, wherein the production file system is also stored in the electronic data storage system, and wherein the file handle indicating the location for the object in said one of the related snapshot file systems in the electronic data storage system further includes a respective external file identifier (fid) distinguishing the production file system from the related snapshot file systems in the group of related snapshot file systems.

7. The computer-implemented method as claimed in claim 3, which includes encoding in the file handle an indication of whether the object is located in either a file system that is not configured to have related snapshot file systems, a production file system configured to have related snapshot file systems, or a snapshot file system.

8. The computer-implemented method as claimed in claim 1, wherein the electronic data storage system is a network file server, the method includes performing a client-server protocol for file access, the client-server protocol is performed by a client-server protocol layer of programming of the network file server, and the method includes interchanging file system identifiers and file identifiers of the related snapshot file systems as the file system identifiers and file identifiers are passed between the client-server protocol layer of programming and the related snapshot file systems.

9. The computer-implemented method as claimed in claim 1, which includes initially configuring each of the related snapshot file systems to have a common internal file identifier (fid') and a different respective internal file system identifier (fsid').

10. The computer-implemented method as claimed in claim 1, wherein the electronic data storage system is a network file server, and the method includes re-programming a client-server protocol layer for the network file server to interchange file system identifiers and file identifiers for the related snapshot file systems.

11. A method of configuring a network file server for access to a group of related snapshot file systems in data storage of the network file server, each of the related snapshot file systems being the state of a production file system at a respective point in time, the network file server having a client-server protocol layer of programming for client access to file system objects in the data storage of the network file server, said method comprising:

configuring each of the related snapshot file systems to have a common internal file identifier (fid') and a different respective internal file system identifier (fsid'); and programming the network file server for interchanging the common internal file identifier (fid') with the different respective internal file system identifier (fsid') of each related snapshot file system for access using the client-server protocol layer to said each related snapshot file system.

12. The method as claimed in claim 11, wherein the production file system is stored in the data storage of the network file server, and wherein the method further includes:

configuring the production file system to have the common internal file identifier (fid') and an internal file system identifier (fsid'), and programming the network file server for interchanging the common internal file identifier (fid') with the internal file system identifier (fsid') of the production file system for access of the client-server protocol layer to the production file system in the data storage of the network file server.

13. The method as claimed in claim 11, wherein the client-server protocol layer responds to a directory lookup request from a client by returning to the client a file handle pointing to a file system object in the data storage of the network file server, and wherein the method further includes programming the client-server protocol layer to encode, in the file handle, an indication of whether the object is located in either a file system that is not configured to have related snapshot file systems, a production file system configured to have related snapshot file systems, or a snapshot file system.

14. The method as claimed in claim 11, wherein the client-server protocol layer responds to a directory lookup request from a client to produce and return to the client a file handle pointing to a file system object in one of the related snapshot file systems in the data storage of the network file server, and wherein the method further includes programming the client-server protocol layer to encode, in the file handle, a mount handle indicating where the group of related snapshot file systems is mounted in the data storage of the network file server, a file identifier indicating where said one of the related snapshot file systems is located within the group of related snapshot file systems, and a file identifier indicating where the file system object is located within said one of the related snapshot file systems.

15. The method as claimed in claim 11, wherein the production file system is stored in the data storage of the network file server, the client-server protocol layer responds to a directory lookup request from a client for access to a file system object in one of the related snapshot file systems by returning to the client a file handle pointing to the file system object in said one of the related snapshot file systems, and wherein the method further includes programming the client-server protocol layer to encode, in the file handle, a file identifier indicating where the production file system is located in the data storage of the network file server, a file identifier indicating where said one of the related snapshot file systems is located in the data storage of the network file server, and a file identifier indicating where the file system object is located within said one of the related snapshot file systems.

16. A method of configuring a network file server for access to a group of related snapshot file systems in data storage of the network file server, each of the related snapshot file systems being the state of a production file system at a respective point in time, the network file server having a client-server protocol layer of programming for client access to file system objects in the data storage of the network file server, said method comprising:

configuring each of the related snapshot file systems to have a common internal file identifier (fid') and a different respective internal file system identifier (fsid'); and programming the network file server for interchanging the common internal file identifier (fid') with the internal file system identifier (fsid') of each related snapshot file system for access of the client-server protocol layer to said each related snapshot file system.

17. The method as claimed in claim 16, wherein the production file system is stored in the data storage of the network file server, and wherein the method further includes:

configuring the production file system to have the common internal file identifier (fid') and an internal file system identifier (fsid'), and programming the network file server for interchanging the common internal file identifier (fid') with the internal file system identifier (fsid') of the production file system for access of the client-server protocol layer to the production file system.

18. The method as claimed in claim 16, wherein the client-server protocol responds to a directory lookup request from a client to produce and return to the client a file handle pointing to a file system object in the data storage of the network file server, and wherein the method further includes programming the client-server protocol layer to encode, in the file handle, an indication of whether the object is located in either a file system that is not configured to have related snapshot file systems, a production file system configured to have related snapshot file systems, or a snapshot file system.

19. The method as claimed in claim 16, wherein the client-server protocol responds to a directory lookup request from a client by returning to the client a file handle pointing to a file system object in one of the related snapshot file systems in the data storage of the network file server, and wherein the method further includes programming the client-server protocol layer to encode, in the file handle, a mount handle indicating where the group of related snapshot file systems is mounted in the data storage of the network file server, a file identifier indicating where said one of the related snapshot file systems is located within the group of related snapshot file systems, and a file identifier indicating where the file system object is located within said one of the related snapshot file systems.

20. A method of operating a network file server having data storage storing a production file system and related snapshot file systems, each of the related snapshot file systems being the state of the production file system at a respective point in time, wherein the method comprises:

responding to a directory lookup request from a client for access to a file system object in one of the related snapshot file systems by returning to the client a file handle pointing to the file system object in said one of the related snapshot file systems, and responding to an access request including the file handle by decoding the file handle to locate and access the object in said one of the related snapshot file systems; which includes encoding in the file handle a file identifier indicating where the production file system is located in the data storage of the network file server, a file identifier indicating where said one of the related snapshot file systems is located in the data storage of the network file server, and a file identifier indicating where the file system object is located within said one of the related snapshot file systems.

21. The method as claimed in claim 20, wherein the production file system and the related snapshot file systems are included in a parent file system, and wherein the method further includes encoding in the file handle a file system identifier of the parent file system.

22. A method of operating a network file server having data storage storing a production file system and related snapshot file systems, each of the related snapshot file systems being the state of the production file system at a respective point in time, wherein the method comprises:
    responding to a directory lookup request from a client for access to a file system object in the data storage of the network file server by returning to the client a file handle pointing to the file system object in the data storage of the network file server, and
    responding to an access request including the file handle by decoding the file handle to locate and access the object in the data storage of the network file server, which includes encoding in the file handle an indication of whether the file system object is in either a file system that is not configured for having related snapshot file systems, a production file system that is configured for having related snapshot file systems, or a snapshot file system,
    wherein the production file system and the related snapshot file systems are included in a parent file system, and wherein the method further includes encoding in the file handle a file system identifier of the parent file system.

23. The method as claimed in claim 22, wherein the object is in one of the related snapshot file systems, and the file handle includes a file identifier indicating where the production file system is found in the data storage of the network file server, a file identifier indicating where said one of the related snapshot file systems is located in the data storage of the network file server, and a file identifier indicating where the object is located in said one of the related snapshot file systems.

24. The method as claimed in claim 22, wherein the object is in the production file system, the file handle includes a file identifier indicating where the object is located in the production file system, and the file handle includes two instances of a file identifier indicating where the production file system is found in the data storage of the network file server.

25. The method as claimed in claim 22, wherein the file handle includes a first sub-block that includes a file identifier of the production file system if the object is not in a file system that is not configured for having related snapshots, a second sub-block that includes a file system identifier of a file system including the object if the object is in a file system that is not configured for having related snapshots or otherwise the second sub-block includes a file system identifier of the parent file system, a third sub-block that includes the file identifier of the production file system if the object is in the production file system or that includes the file identifier of one of the related snapshot file systems if the object is in one of the related snapshot file systems, and a fourth sub-block that includes an identifier indicating where the object is located in the file system that is not configured for having related snapshots, in the production file system, or in said one of the related snapshot file systems.

26. A network file server comprising:
    data storage for storing a production file system and a group of related snapshot file systems, each of the related snapshot file systems being the state of the production file system at a respective point in time; and
    a client-server protocol layer of programming for client access to file system objects in the data storage of the network file server;
    wherein each of the related snapshot file systems has a common internal file identifier (fid') and a different respective internal file system identifier (fsid'); and
    wherein the network file server is programmed for interchanging the common internal file identifier (fid') with the respective internal file system identifier (fsid') of each related snapshot file system for access of the client-server protocol layer to said each related snapshot file system.

27. The network file server as claimed in claim 26, wherein the production file system has the common internal file identifier (fid') and an internal file system identifier (fsid'), and the network file server is programmed for interchanging the common internal file identifier (fid') with the internal file system identifier (fsid') of the production file system for access of the client-server protocol layer to the production file system.

28. The network file server as claimed in claim 26, wherein the client-server protocol responds to a directory lookup request from a client to produce and return to the client a file handle pointing to a file system object in the data storage of the network file server, and
    wherein the client-server protocol layer encodes, in the file handle, an indication of whether the object is located in either a file system that is not configured to have related snapshot file systems, a production file system configured to have related snapshot file systems, or a snapshot file system.

29. The network file server as claimed in claim 28, which includes decoding and comparing sub-blocks of the file handle to determine whether the object is in either a file system that is not configured for having related snapshot file systems, a production file system that is configured for having related snapshot file systems, or a snapshot file system.

30. The network file server as claimed in claim 29, wherein the mount handle includes a file system identifier identifying a file system including the production file system and the related snapshot file systems, and a file identifier of the production file system.

31. The network file server as claimed in claim 28, wherein the client-server protocol layer decodes the file handle returned from the client to determine whether to invoke a first routine for accessing a file system that is not configured for having related snapshot file systems, a second routine for accessing a production file system that is configured for having related snapshot file systems, or a third routine for accessing a snapshot file system.

32. The network file server as claimed in claim 26, wherein the client-server protocol layer responds to a directory lookup request from a client by returning to the client a file handle pointing to a file system object in one of the related snapshot file systems, and wherein the client-server protocol layer encodes, in the file handle, a mount handle indicating where the group of related snapshot file systems is mounted in the data storage, a file identifier indicating where said one of the related snapshot file systems is located within the group of related snapshot file systems, and a file identifier indicating where the object is located within said one of the related snapshot file systems.

33. A network file server comprising:
data storage for storing a production file system and a group of related snapshot file systems, each of the related snapshot file systems being the state of the production file system at a respective point in time; and
a client-server protocol layer of programming for client access to file system objects in the data storage of the network file server;
wherein the client-server protocol layer responds to a directory lookup request from a client for access to a file system object in one of the related snapshot file systems by returning to the client a file handle pointing to the file system object in said one of the related snapshot file systems, and
the client-server protocol layer responds to an access request from the client, the access request including the file handle, the client-server protocol layer responding by decoding the file handle to locate and access the object in said one of the related snapshot file systems;
wherein the client-server protocol layer encodes in the file handle a file identifier indicating where the production file system is located in the data storage of the network file server, a file identifier indicating where said one of the related snapshot file systems is located in the data storage of the network file server, and a file identifier indicating where the file system object is located within said one of the related snapshot file systems.

34. The network file server as claimed in claim 33, wherein the production file system and the related snapshot file systems are included in a parent file system, and wherein the client-server protocol layer includes in the file handle a file system identifier of the parent file system.

35. A network file server comprising:
data storage for storing a production file system and a group of related snapshot file systems, each of the related snapshot file systems being the state of the production file system at a respective point in time; and
a client-server protocol layer of programming for client access to file system objects in the data storage of the network file server;
wherein the client-server protocol layer responds to a directory lookup request from a client for access to a file system object in the data storage by returning to the client a file handle pointing to the file system object in the data storage, and
the client-server protocol layer responds to an access request from the client, the access request including the file handle, the client-server protocol layer responding to the access request by decoding the file handle to locate and access the object in the data storage,
wherein the client-server protocol layer encodes in the file handle an indication of whether the file system object is in either a file system that is not configured for having related snapshot file systems, a production file system that is configured for having related snapshot file systems, or a snapshot file system.

36. The network file server as claimed in claim 35, wherein the object is in one of the related snapshot file systems, and the file handle includes a file identifier indicating where the production file system is found in the data storage of the network file server, a file identifier indicating where said one of the related snapshot file systems is located in the data storage of the network file server, and a file identifier indicating where the object is located in said one of the related snapshot file systems.

37. The network file server as claimed in claim 35, wherein the object is in the production file system, the file handle includes a file identifier indicating where the object is located in the production file system, and the file handle includes two instances of a file identifier indicating where the production file system is found in the data storage of the network file server.

38. The network file server as claimed in claim 35, wherein the client-server protocol layer decodes and compares sub-blocks of the file handle to determine whether the file system object is in either a file system that is not configured for having related snapshot file systems, a production file system that is configured for having related snapshot file systems, or a snapshot file system.

39. The network file server as claimed in claim 38, wherein the network file server is programmed with a first file access routine for accessing a file in a file system that is not configured for having related snapshot file systems, a second file access routine for accessing a file in a production file system that is configured for having related snapshot file systems, and a third file access routine for accessing a file in a snapshot file system.

40. The network file server as claimed in claim 35, wherein the production file system and the related snapshot file systems are included in a parent file system, and wherein the client-server protocol layer encodes in the file handle a file system identifier of the parent file system.

41. The network file server as claimed in claim 40, wherein the file handle includes a first sub-block that includes a file identifier of the production file system if the object is not in a file system that is not configured for having snapshots, a second sub-block that includes a file system identifier if the object is in a file system that is not configured for having snapshots or otherwise includes a file system identifier of the parent file system, a third sub-block that includes the file identifier of the production file system if the object is in the production file system or that includes the file identifier of one of the related snapshot file systems if the object is in one of the related snapshot file systems, and a fourth sub-block that includes an identifier indicating where the object is located in the file system that is not configured for having related snapshots, in the production file system, or in said one of the related snapshot file systems.

* * * * *